United States Patent
Ferrari

(10) Patent No.: US 7,908,757 B2
(45) Date of Patent: Mar. 22, 2011

(54) ARTICULATING MEASURING ARM WITH LASER SCANNER

(75) Inventor: Paul Ferrari, Carlsbad, CA (US)

(73) Assignee: Hexagon Metrology, Inc., Norcross, GA (US)

( * ) Notice: Subject to any disclaimer, the term of this patent is extended or adjusted under 35 U.S.C. 154(b) by 28 days.

(21) Appl. No.: 12/487,535

(22) Filed: Jun. 18, 2009

(65) Prior Publication Data

US 2010/0095542 A1    Apr. 22, 2010

Related U.S. Application Data

(60) Provisional application No. 61/106,096, filed on Oct. 16, 2008.

(51) Int. Cl.
*G01B 5/008* (2006.01)

(52) U.S. Cl. .................. 33/503; 33/DIG. 21; 356/614

(58) Field of Classification Search ............. 33/503, 33/DIG. 21; 356/614
See application file for complete search history.

(56) References Cited

U.S. PATENT DOCUMENTS

| | | | |
|---|---|---|---|
| 4,972,090 A | 11/1990 | Eaton | |
| 5,006,721 A | 4/1991 | Cameron et al. | |
| RE33,774 E * | 12/1991 | Gurny | 33/503 |
| 5,084,981 A | 2/1992 | McMurtry et al. | |
| 5,088,337 A | 2/1992 | Bennett | |
| 5,148,377 A | 9/1992 | McDonald | |
| 5,187,874 A | 2/1993 | Takahashi et al. | |
| 5,189,797 A | 3/1993 | Granger | |
| 5,251,127 A | 10/1993 | Raab | |
| 5,305,203 A | 4/1994 | Raab | |
| 5,396,712 A | 3/1995 | Herzog | |
| 5,402,582 A | 4/1995 | Raab | |
| 5,408,754 A | 4/1995 | Raab | |
| 5,412,880 A | 5/1995 | Raab | |
| 5,424,835 A | 6/1995 | Cosnard et al. | |
| 5,505,003 A | 4/1996 | Evans et al. | |
| 5,510,977 A | 4/1996 | Raab | |
| 5,521,847 A | 5/1996 | Ostrowski et al. | |
| 5,526,576 A | 6/1996 | Fuchs et al. | |
| 5,528,505 A | 6/1996 | Granger et al. | |
| 5,530,549 A | 6/1996 | Brown | |

(Continued)

FOREIGN PATENT DOCUMENTS

DE    4345091    7/1995

(Continued)

OTHER PUBLICATIONS

European Search Report and Written Opinion (EP 09173212.3-2213/2177868) Apr. 23, 2010. KREON Technologies, Scanners - KREON Technologies, http://www.kreon3d.com/english/scanners/, May 28, 2009, pp. 2.

* cited by examiner

*Primary Examiner* — G. Bradley Bennett

(74) *Attorney, Agent, or Firm* — Knobbe Martens Olson & Bear LLP

(57) ABSTRACT

A coordinate measurement device comprises an articulated arm having a first end, a second end, and a plurality of jointed arm segments therebetween. Each arm segment defines at least one axis of rotation. A laser scanner assembly is coupled to the second end of the arm and is rotatable about a last axis of rotation of the articulated arm. The laser scanner assembly comprises a laser and an image sensor. The laser is positioned on an opposite side of the last axis of rotation from the image sensor.

32 Claims, 18 Drawing Sheets

U.S. PATENT DOCUMENTS

| | | | |
|---|---|---|---|
| 5,611,147 A | 3/1997 | Raab | |
| 5,615,489 A * | 4/1997 | Breyer et al. | 33/503 |
| 5,748,767 A | 5/1998 | Raab | |
| 5,757,499 A | 5/1998 | Eaton | |
| 5,768,792 A | 6/1998 | Raab | |
| 5,794,356 A | 8/1998 | Raab | |
| 5,822,450 A | 10/1998 | Arakawa et al. | |
| 5,829,148 A | 11/1998 | Eaton | |
| 5,917,181 A | 6/1999 | Yoshizumi et al. | |
| 5,926,782 A | 7/1999 | Raab | |
| 5,956,857 A | 9/1999 | Raab | |
| 5,957,837 A | 9/1999 | Raab | |
| 5,978,748 A | 11/1999 | Raab | |
| 5,991,704 A | 11/1999 | Rekar et al. | |
| 6,012,332 A | 1/2000 | Schafer | |
| 6,029,522 A | 2/2000 | Schafer | |
| 6,078,846 A | 6/2000 | Greer et al. | |
| 6,092,418 A | 7/2000 | Schafer | |
| 6,092,419 A | 7/2000 | Dixon | |
| 6,128,081 A | 10/2000 | White | |
| 6,131,299 A | 10/2000 | Raab et al. | |
| 6,134,506 A | 10/2000 | Rosenberg et al. | |
| 6,151,789 A | 11/2000 | Raab | |
| 6,161,079 A | 12/2000 | Zink et al. | |
| 6,166,811 A | 12/2000 | Long et al. | |
| 6,180,939 B1 | 1/2001 | Markey, Jr. et al. | |
| 6,219,928 B1 | 4/2001 | Raab et al. | |
| 6,253,458 B1 | 7/2001 | Raab et al. | |
| 6,256,038 B1 | 7/2001 | Krishnamurthy | |
| 6,256,039 B1 | 7/2001 | Krishnamurthy | |
| 6,271,856 B1 | 8/2001 | Krishnamurthy | |
| 6,276,209 B1 | 8/2001 | Schafer | |
| 6,279,246 B1 | 8/2001 | van den Bossche | |
| 6,295,907 B1 | 10/2001 | Schafer | |
| 6,298,569 B1 | 10/2001 | Raab et al. | |
| 6,366,831 B1 | 4/2002 | Raab | |
| 6,367,330 B1 | 4/2002 | Schafer | |
| 6,413,212 B1 | 7/2002 | Raab | |
| 6,457,363 B1 | 10/2002 | Schafer | |
| 6,460,004 B2 | 10/2002 | Greer et al. | |
| 6,467,352 B2 | 10/2002 | Schafer | |
| 6,481,289 B2 | 11/2002 | Dixon | |
| 6,487,896 B1 | 12/2002 | Dall'Aglio | |
| 6,526,670 B1 | 3/2003 | Carli | |
| 6,535,794 B1 | 3/2003 | Raab | |
| 6,593,587 B2 | 7/2003 | Pease | |
| 6,598,306 B2 | 7/2003 | Eaton | |
| 6,606,539 B2 | 8/2003 | Raab et al. | |
| 6,611,346 B2 | 8/2003 | Granger | |
| 6,611,617 B1 | 8/2003 | Crampton | |
| 6,612,044 B2 | 9/2003 | Raab et al. | |
| 6,618,496 B1 | 9/2003 | Tassakos et al. | |
| 6,661,820 B1 | 12/2003 | Camilleri et al. | |
| 6,668,466 B1 | 12/2003 | Bieg et al. | |
| 6,684,705 B1 | 2/2004 | Schafer | |
| 6,717,166 B2 | 4/2004 | Pease | |
| 6,759,648 B2 | 7/2004 | Baxter et al. | |
| 6,769,307 B1 | 8/2004 | Dixon | |
| 6,796,048 B2 | 9/2004 | Steffey et al. | |
| 6,817,108 B2 | 11/2004 | Eaton | |
| 6,820,346 B2 | 11/2004 | Raab et al. | |
| 6,858,857 B2 | 2/2005 | Pease | |
| 6,858,858 B2 | 2/2005 | Pease | |
| 6,868,359 B2 | 3/2005 | Raab | |
| 6,879,933 B2 | 4/2005 | Steffey et al. | |
| 6,892,465 B2 | 5/2005 | Raab et al. | |
| 6,904,691 B2 | 6/2005 | Raab et al. | |
| 6,920,697 B2 | 7/2005 | Raab et al. | |
| 6,925,722 B2 | 8/2005 | Raab et al. | |
| 6,931,745 B2 | 8/2005 | Granger | |
| 6,935,036 B2 | 8/2005 | Raab et al. | |
| 6,944,564 B2 | 9/2005 | De Jonge et al. | |
| 6,952,882 B2 | 10/2005 | Raab et al. | |
| 6,957,496 B2 | 10/2005 | Raab et al. | |
| 6,964,113 B2 | 11/2005 | Bridges et al. | |
| 6,973,734 B2 | 12/2005 | Raab et al. | |
| 6,984,236 B2 | 1/2006 | Raab | |
| 6,988,322 B2 | 1/2006 | Raab et al. | |
| 6,996,912 B2 | 2/2006 | Raab et al. | |
| 7,003,892 B2 | 2/2006 | Eaton et al. | |
| 7,006,084 B1 | 2/2006 | Buss et al. | |
| 7,017,275 B2 | 3/2006 | Raab et al. | |
| 7,024,032 B2 | 4/2006 | Kidd et al. | |
| 7,032,321 B2 | 4/2006 | Raab et al. | |
| 7,043,847 B2 | 5/2006 | Raab et al. | |
| 7,051,450 B2 | 5/2006 | Raab et al. | |
| 7,069,664 B2 | 7/2006 | Raab et al. | |
| 7,073,271 B2 | 7/2006 | Raab et al. | |
| 7,096,077 B2 | 8/2006 | Price et al. | |
| 7,113,878 B1 | 9/2006 | Loferer et al. | |
| 7,145,162 B2 | 12/2006 | Cheng et al. | |
| 7,152,456 B2 | 12/2006 | Eaton | |
| 7,174,651 B2 | 2/2007 | Raab et al. | |
| 7,193,690 B2 | 3/2007 | Ossig et al. | |
| 7,246,030 B2 | 7/2007 | Raab et al. | |
| 7,248,374 B2 | 7/2007 | Bridges | |
| 7,268,892 B2 | 9/2007 | Van Den Bossche | |
| 7,269,910 B2 | 9/2007 | Raab et al. | |
| 7,280,226 B2 | 10/2007 | Van Den Bossche | |
| 7,296,364 B2 | 11/2007 | Seitz et al. | |
| 7,296,979 B2 | 11/2007 | Raab et al. | |
| 7,299,145 B2 | 11/2007 | De Jonge et al. | |
| 7,313,264 B2 | 12/2007 | Crampton | |
| 7,372,581 B2 | 5/2008 | Raab et al. | |
| 7,384,308 B2 | 6/2008 | Boehnlein et al. | |
| 7,395,606 B2 * | 7/2008 | Crampton | 33/503 |
| 7,428,061 B2 | 9/2008 | Coppenolle et al. | |
| 7,431,619 B2 | 10/2008 | Boehnlein et al. | |
| 7,441,341 B2 | 10/2008 | Eaton | |
| 7,519,493 B2 | 4/2009 | Atwell et al. | |
| 7,519,843 B1 | 4/2009 | Atwell et al. | |
| 7,525,276 B2 | 4/2009 | Eaton | |
| 7,546,689 B2 | 6/2009 | Ferrari et al. | |
| 7,552,543 B2 | 6/2009 | Tomelleri | |
| 7,568,293 B2 | 8/2009 | Ferrari | |
| 7,576,847 B2 | 8/2009 | Bridges | |
| 7,578,069 B2 | 8/2009 | Eaton | |
| D599,226 S | 9/2009 | Gerent et al. | |
| 7,581,988 B2 | 9/2009 | Boehnlein et al. | |
| 7,584,534 B2 | 9/2009 | Pease et al. | |
| 7,591,078 B2 | 9/2009 | Crampton | |
| 7,604,207 B2 | 10/2009 | Hasloecher et al. | |
| 7,624,510 B2 | 12/2009 | Ferrari | |
| 7,640,674 B2 | 1/2010 | Ferrari et al. | |
| 7,676,945 B2 | 3/2010 | Prestidge et al. | |
| 7,693,325 B2 | 4/2010 | Pulla et al. | |
| 7,701,559 B2 | 4/2010 | Bridges et al. | |
| 7,712,468 B2 | 5/2010 | Hargadon | |
| 7,733,544 B2 | 6/2010 | Becker et al. | |
| 7,735,234 B2 | 6/2010 | Briggs et al. | |
| 7,743,524 B2 | 6/2010 | Eaton et al. | |
| 7,758,495 B2 | 7/2010 | Pease et al. | |
| 7,765,707 B2 | 8/2010 | Tomelleri | |
| 7,774,949 B2 | 8/2010 | Ferrari | |
| 7,779,548 B2 | 8/2010 | Ferrari | |
| 7,805,854 B2 | 10/2010 | Eaton | |
| 2008/0016711 A1 | 1/2008 | Baebler | |
| 2008/0295348 A1 * | 12/2008 | Heiden et al. | 33/502 |
| 2009/0241360 A1 * | 10/2009 | Tait et al. | 33/502 |
| 2009/0271996 A1 * | 11/2009 | Ferrari et al. | 33/502 |
| 2010/0011601 A1 * | 1/2010 | Funabashi et al. | 33/561 |
| 2010/0095542 A1 | 4/2010 | Ferrari | |

FOREIGN PATENT DOCUMENTS

| | | |
|---|---|---|
| DE | 10112977 | 11/2002 |
| DE | 10 2006 0185 | 10/2007 |
| EP | 0522610 | 1/1993 |
| FR | 2740546 | 4/1997 |
| GB | 2274526 | 7/1994 |
| GB | 2 311 862 | 10/1997 |
| JP | 05-031685 | 2/1993 |
| JP | 2003-021133 | 1/2003 |
| JP | 2003-175484 | 6/2003 |
| WO | WO 90/08939 | 8/1990 |
| WO | WO 98/08050 | 2/1998 |
| WO | WO 2005/100908 | 10/2005 |
| WO | WO 2008/080142 | 7/2008 |

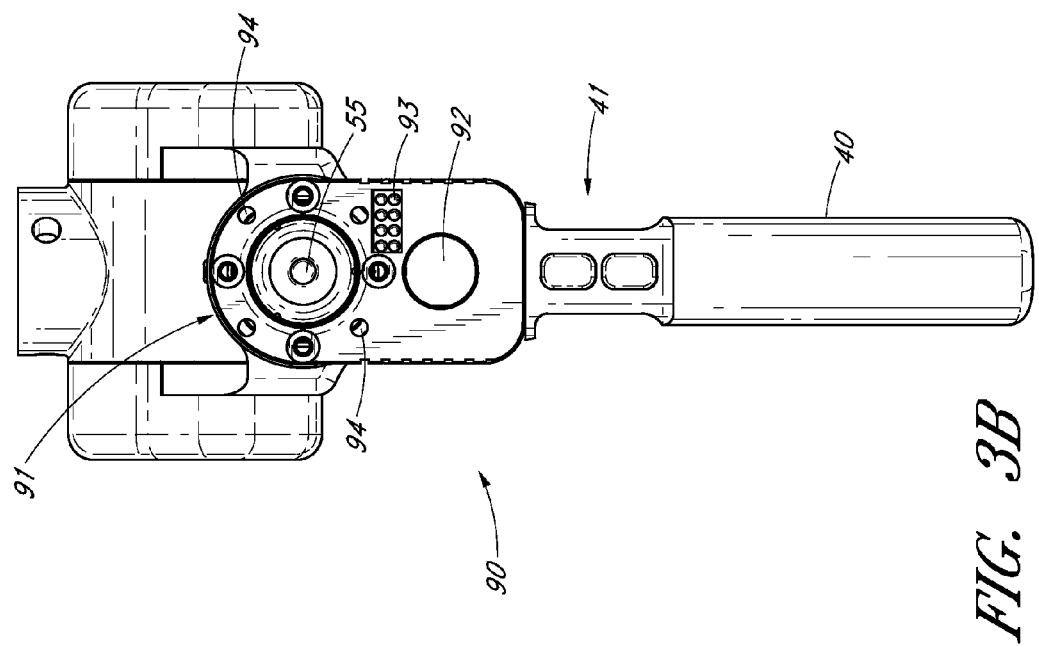
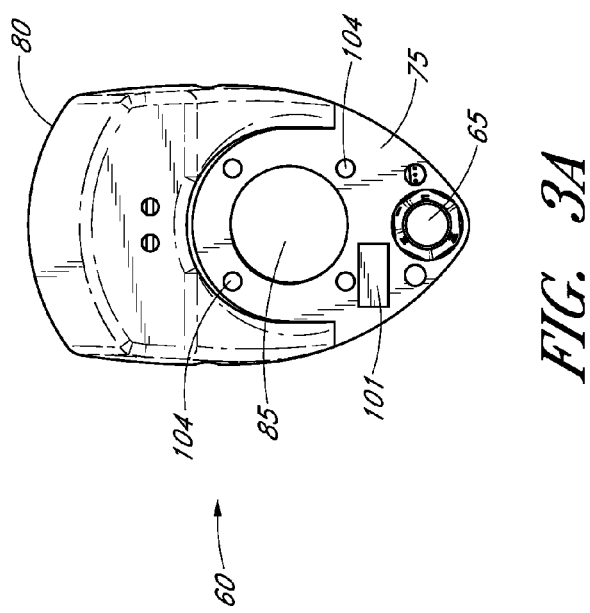
FIG. 3B
FIG. 3A

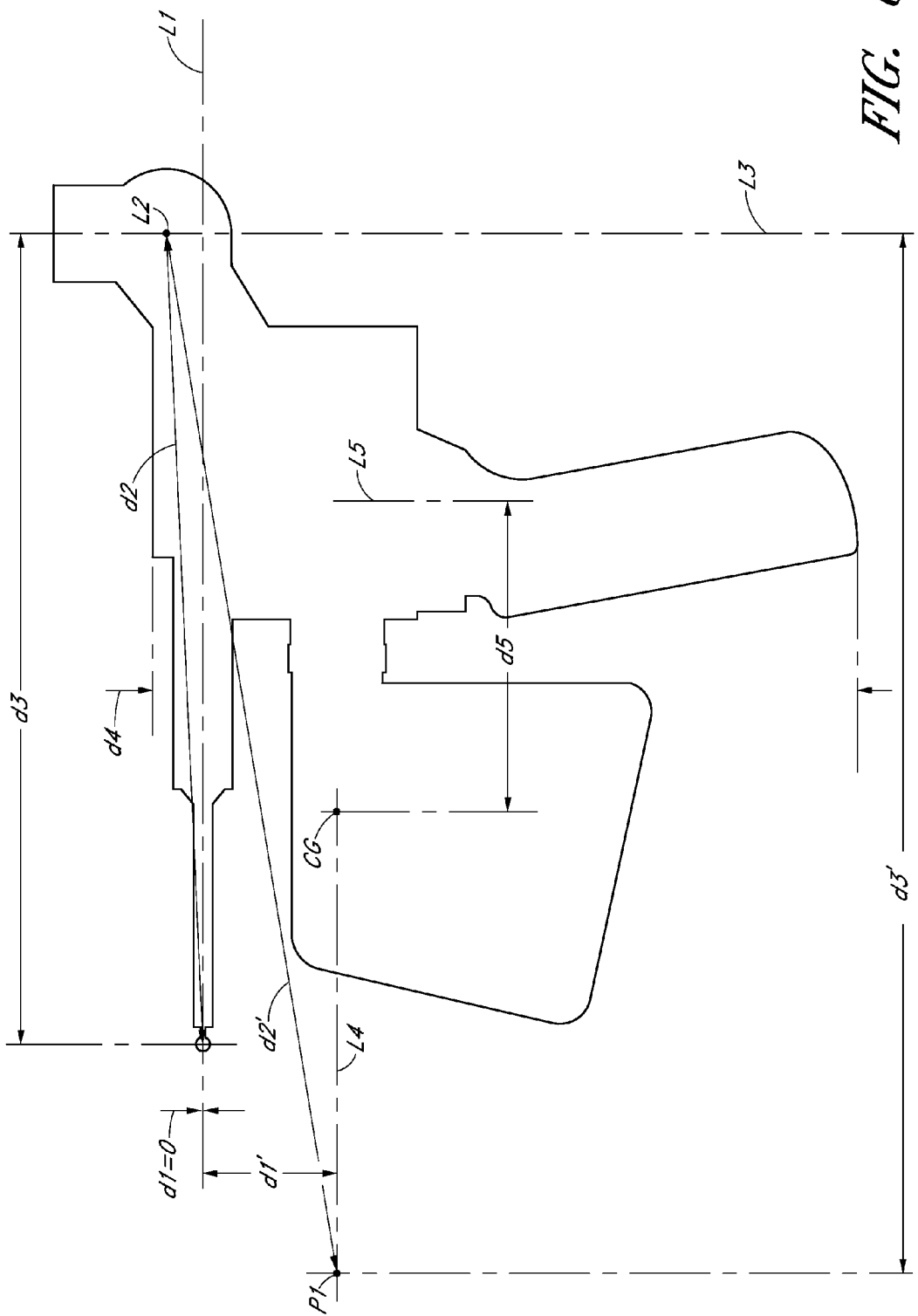

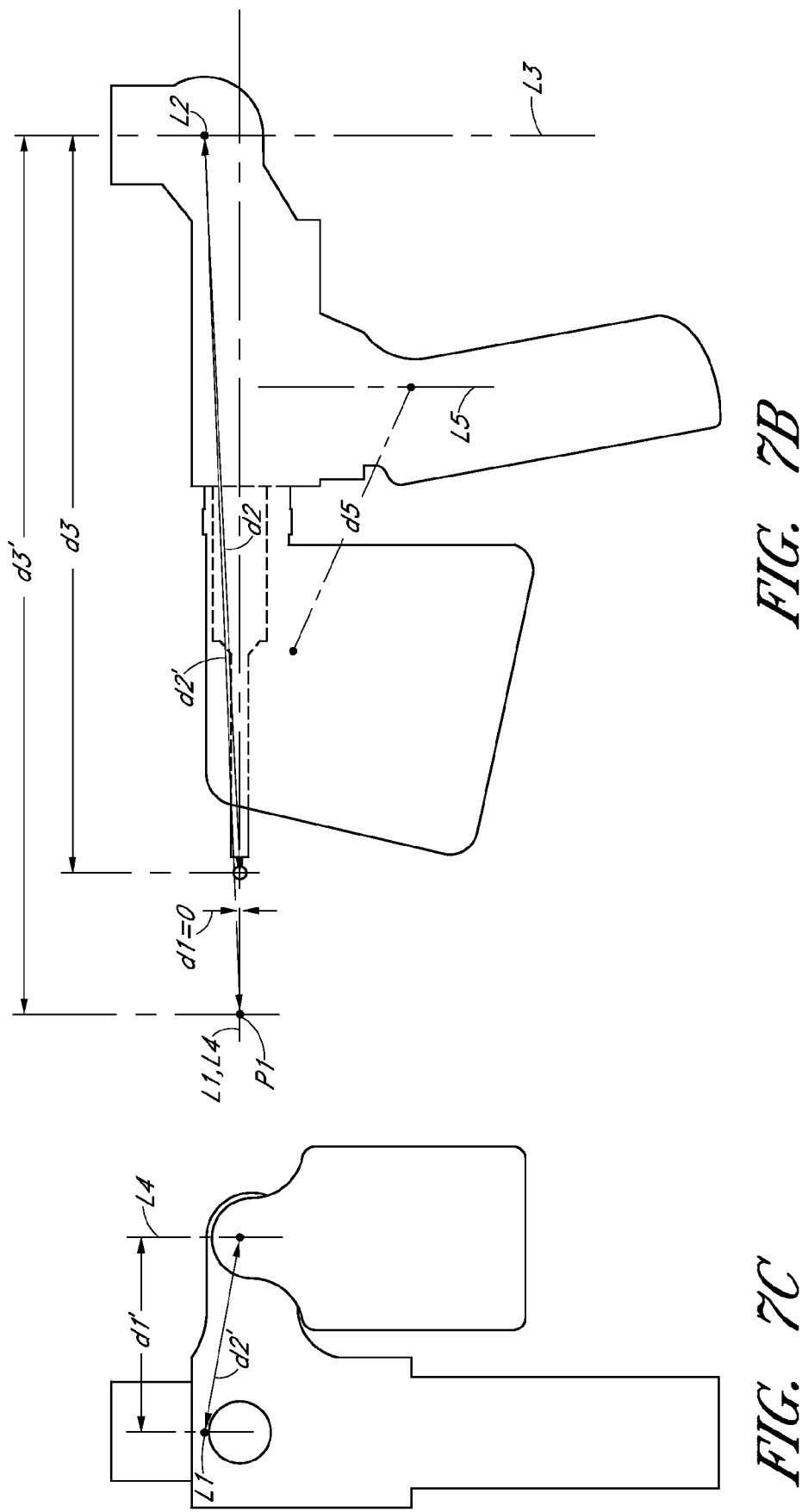

ARTICULATING MEASURING ARM WITH LASER SCANNER

PRIORITY INFORMATION

This application claims the priority benefit under 35 U.S.C. §119(e) to U.S. Provisional Patent Application Ser. No. 61/106,096 (filed Oct. 16, 2008), the entirety of which is hereby expressly incorporated by reference herein.

BACKGROUND OF THE INVENTION

1. Field of the Invention

The present invention relates to coordinate measurement machines and, more particularly, to coordinate measurement machines with laser scanners.

2. Description of the Related Art

Rectilinear measuring systems, also referred to as coordinate measuring machines (CMMs) and articulated arm measuring machines, are used to generate highly accurate geometry information. In general, these instruments capture the structural characteristics of an object for use in quality control, electronic rendering and/or duplication. One example of a conventional apparatus used for coordinate data acquisition is a portable coordinate measuring machine (PCMM), which is a portable device capable of taking highly accurate measurements within a measuring sphere of the device. Such devices often include a probe mounted on an end of an arm that includes a plurality of transfer members connected together by joints. The end of the arm opposite the probe is typically coupled to a moveable base. Typically, the joints are broken down into singular rotational degrees of freedom, each of which is measured using a dedicated rotational transducer. During a measurement, the probe of the arm is moved manually by an operator to various points in the measurement sphere. At each point, the position of each of the joints must be determined at a given instant in time. Accordingly, each transducer outputs an electrical signal that varies according to the movement of the joint in that degree of freedom. Typically, the probe also generates a signal. These position signals and the probe signal are transferred through the arm to a recorder/analyzer. The position signals are then used to determine the position of the probe within the measurement sphere. See e.g. U.S. Pat. Nos. 5,829,148 and 7,174,651, which are incorporated herein by reference in their entireties.

Increasingly, PCMM's are used in combination with an optical or laser scanner. In such applications the optical or laser scanner typically includes an optics system, a laser or light source, sensors and electronics that are all housed in one box. The laser scanner box is then, in turn, coupled to the probe end of the PCMM and to a side of the probe. The various locations that existed for mounting the laser scanning box include positioning the box on top of the probe, forward and below the axis of the probe, and/or off to the side of the probe. In this manner, 2-dimensional and/or 3-dimensional data could be gathered with the laser scanner and combined with the position signals generated by the PCMM. See e.g., U.S. Pat. No. 7,246,030.

While such PCMM and laser scanner combinations have been useful. As mentioned above, the purpose of PCMM's is to take highly accurate measurements. Accordingly, there is a continuing need to improve the accuracy of such devices.

SUMMARY OF THE INVENTION

One aspect of the present invention is the realization that such prior art systems suffer from a number of inefficiencies. For example, prior art systems typically require a repeatable kinematic mount that would allow the laser scanner to be easily removed and replaced from the arm. Such mounts are generic so that many different types of scanners can be mounted to the same CMM. These generic mounts place the laser scanner in non-optimal locations which results in less accurate laser scanning performance The various locations that existed for mounting the laser scanning box were on top of the last axis, forward and below the last axis, or off to the side of the last axis, as discussed further below.

Accordingly, one embodiment of the present invention comprises an optical position acquisition member. The member can include a base plate that has an opening configured to receive a CMM measuring probe. A laser and an optical sensor can both mount on the plate such that the sensor is generally collinear with the laser and the opening, with the opening between the laser and the sensor.

In another embodiment, an articulated arm CMM is provided. The articulated arm can include a plurality of articulated arm members, a measuring probe, a receiving portion at a distal end, and a base at a proximal end. A base plate can mount on the receiving portion and include a hole positioned such that the measuring probe passes through the hole when mounted. The base plate can couple to a laser and an optical sensor located on opposite sides of the hole.

In yet another embodiment, a coordinate measurement device includes an articulated arm and a laser scanner assembly. The articulated arm can have a first end, a second end, and a plurality of jointed arm segments therebetween. Each arm segment can define at least one axis of rotation of the articulated arm, and a last axis of the arm can be defined by bearings near a distal end of the arm. The laser scanner assembly can couple to the second end of the arm and be rotatable about the last axis of rotation of the articulated arm. Additionally, the laser scanner assembly can include a laser and an image sensor, the laser positioned on an opposite side of the last axis of rotation from the image sensor. Further, at least one of the laser and image sensor can overlap the bearings.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed. In addition, the individual embodiments need not provide all or any of the advantages described above.

BRIEF DESCRIPTION OF THE DRAWINGS

Further objects, features and advantages of the invention will become apparent from the following detailed description taken in conjunction with the accompanying figures showing illustrative embodiments of the invention, in which:

FIG. 3A is a back view of a non-contact coordinate detection device of FIG. 3, at 3A-3A;

FIG. 3B is a front view of a main body of a coordinate acquisition member of FIG. 3, at 3B-3B;

FIG. 6B depicts a side outline view of the coordinate acquisition member of FIG. 6A, indicating various dimensions;

FIG. 7B depicts a side outline view of the coordinate acquisition member of FIG. 7A, indicating various dimensions; and FIG. 7C depicts a front outline view of the coordinate acquisition member of FIG. 7A, indicating various dimensions.

DETAILED DESCRIPTION OF THE PREFERRED EMBODIMENTS

Figure 1:
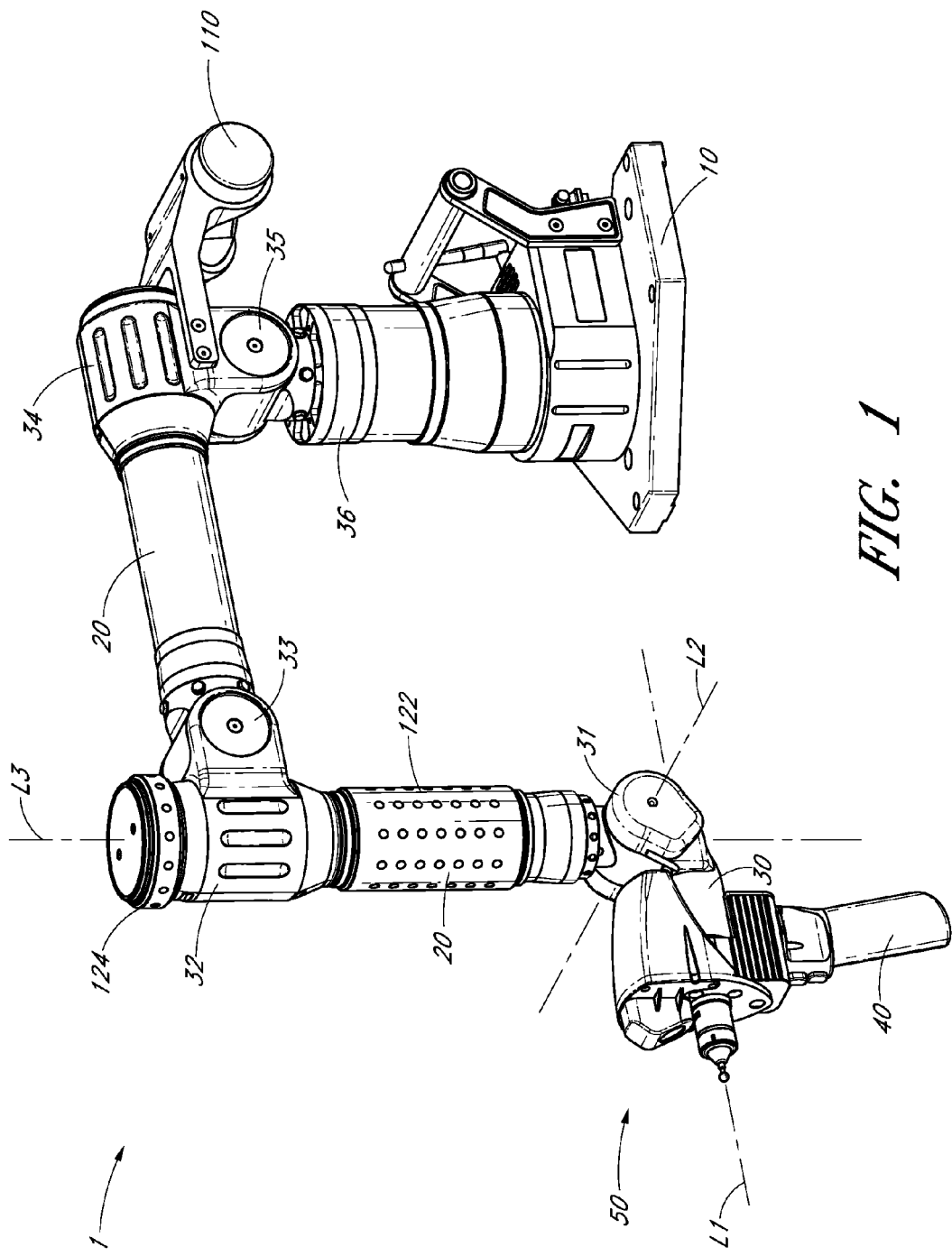
FIG. 1 is a perspective view of an embodiment CMM arm with a laser scanner.
Figure 1A:
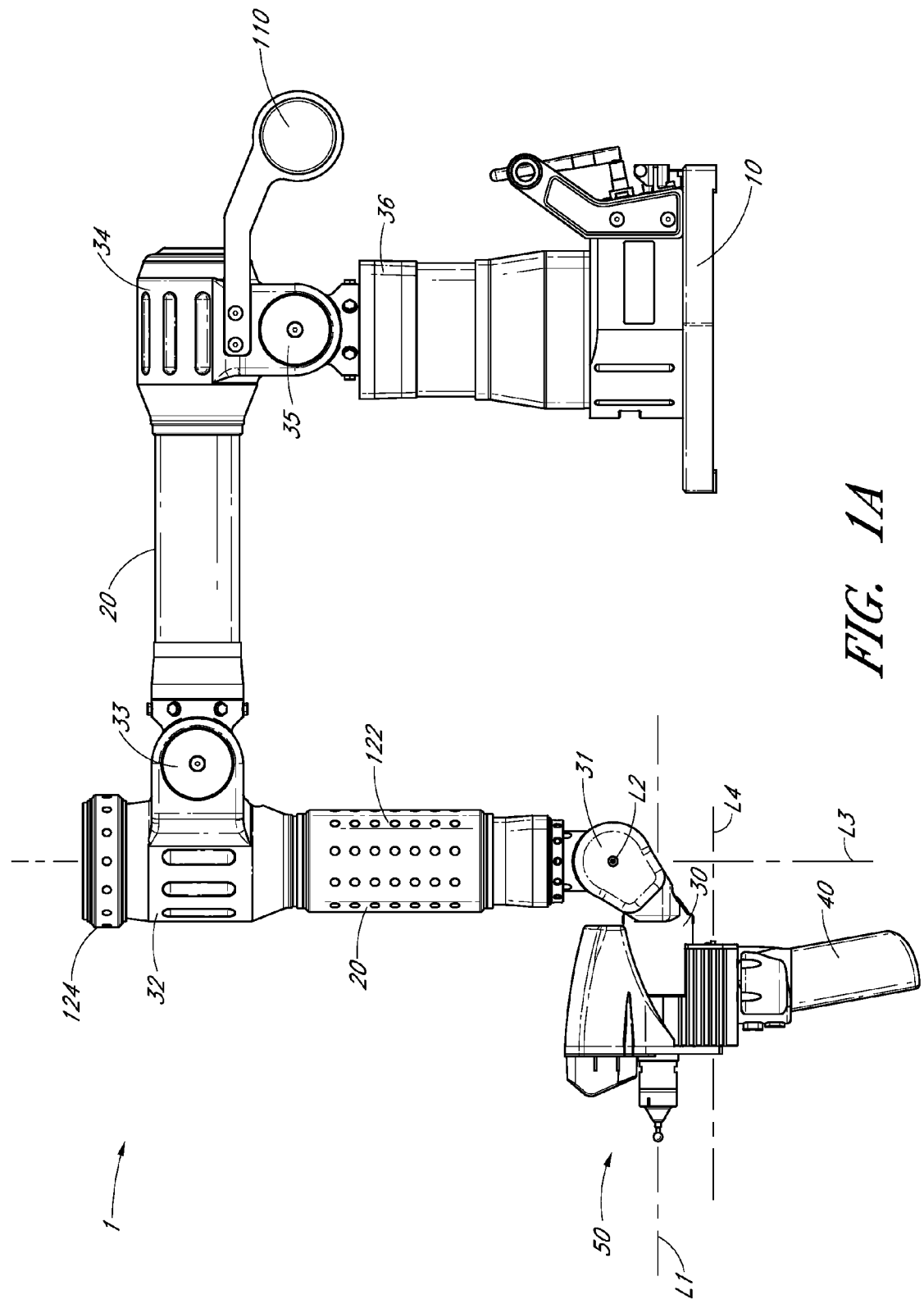
FIG. 1A is a side view of the CMM arm of FIG. 1.
Figure 1B:
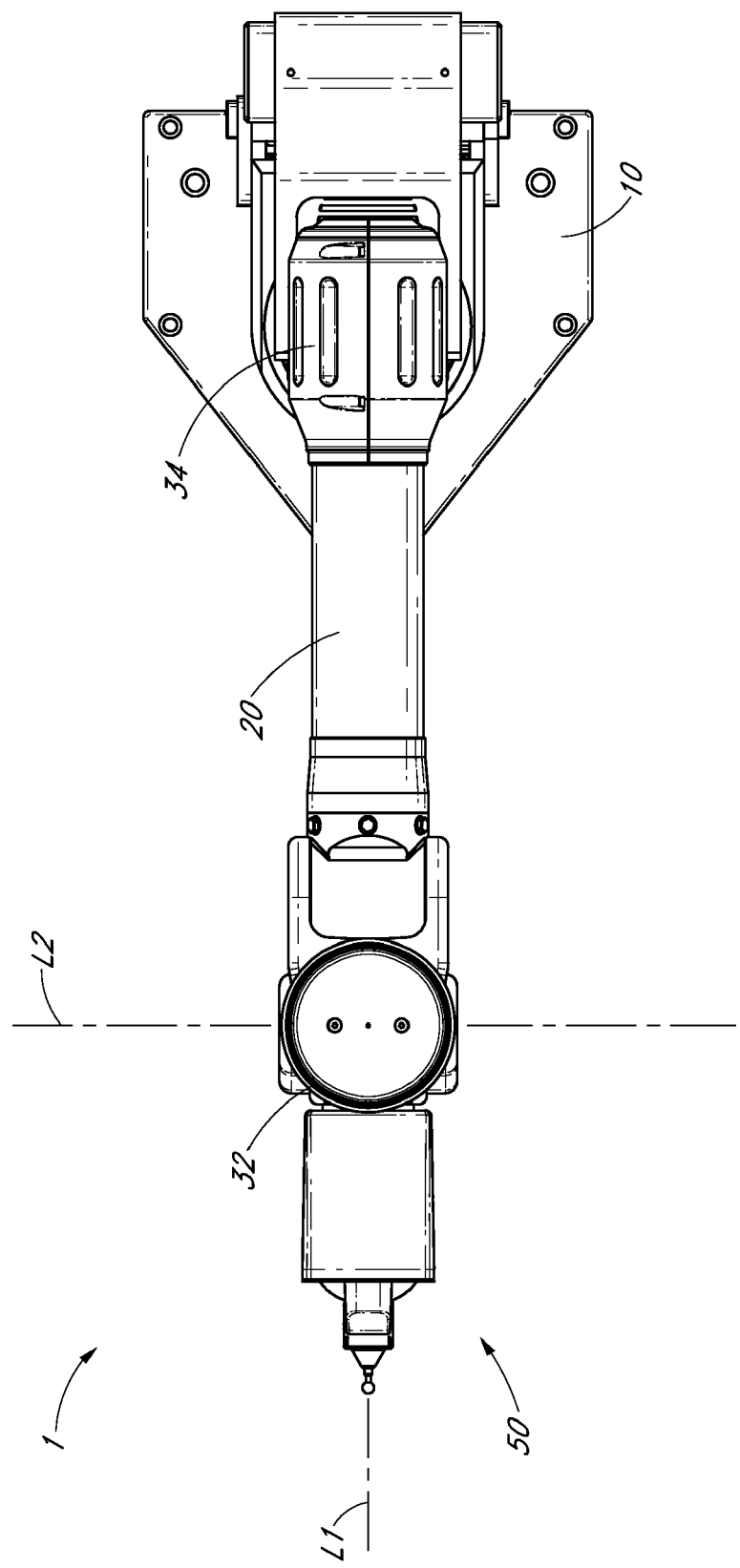
FIG. 1B is a top view of the CMM arm of FIG. 1.

FIGS. 1-1B illustrate one embodiment of a portable coordinate measuring machine (PCMM) 1 in accordance with the present invention. In the illustrated embodiment, the PCMM 1 comprises a base 10, a plurality of rigid transfer members 20, a coordinate acquisition member 50 and a plurality of articulation members 30-36 connecting the rigid transfer members 20 to one another. Each articulation member 30-36 is configured to impart one or more rotational and/or angular degrees of freedom. Through the various articulation members 30-36, the PCMM 1 can be aligned in various spatial orientations thereby allowing fine positioning and orientating of the coordinate acquisition member 50 in three dimensional space.

The position of the rigid transfer members 20 and the coordinate acquisition member 50 may be adjusted using manual, robotic, semi-robotic and/or any other adjustment method. In one embodiment, the PCMM 1, through the various articulation members 30, is provided with seven rotary axes of movement. It will be appreciated, however, that there is no strict limitation to the number of axes of movement that may be used, and fewer or additional axes of movement may be incorporated into the PCMM design.

In the embodiment PCMM 1 illustrated in FIG. 1, the articulation members 30-36 can be divided into two functional groupings based on their operation, namely: 1) those articulation members 30, 32, 34, 36 which allow the swiveling motion associated with a specific transfer member (hereinafter, "swiveling joints"), and 2) those articulation members 31, 33, 35 which allow a change in the relative angle formed between two adjacent members or between the coordinate acquisition member 30 and its adjacent member (hereinafter, "hinge joints"). While the illustrated embodiment includes four swiveling joints and three hinge joints positioned as to create seven axes of movement, it is contemplated that in other embodiments, the number of and location of hinge joints and swiveling joints can be varied to achieve different movement characteristics in a PCMM. For example, a substantially similar device with six axes of movement could simply lack the swivel joint 30 between the coordinate acquisition member 50 and the adjacent articulation member 20. In still other embodiments, the swiveling joints and hinge joints can be combined and/or used in different combinations.

Figure 2:
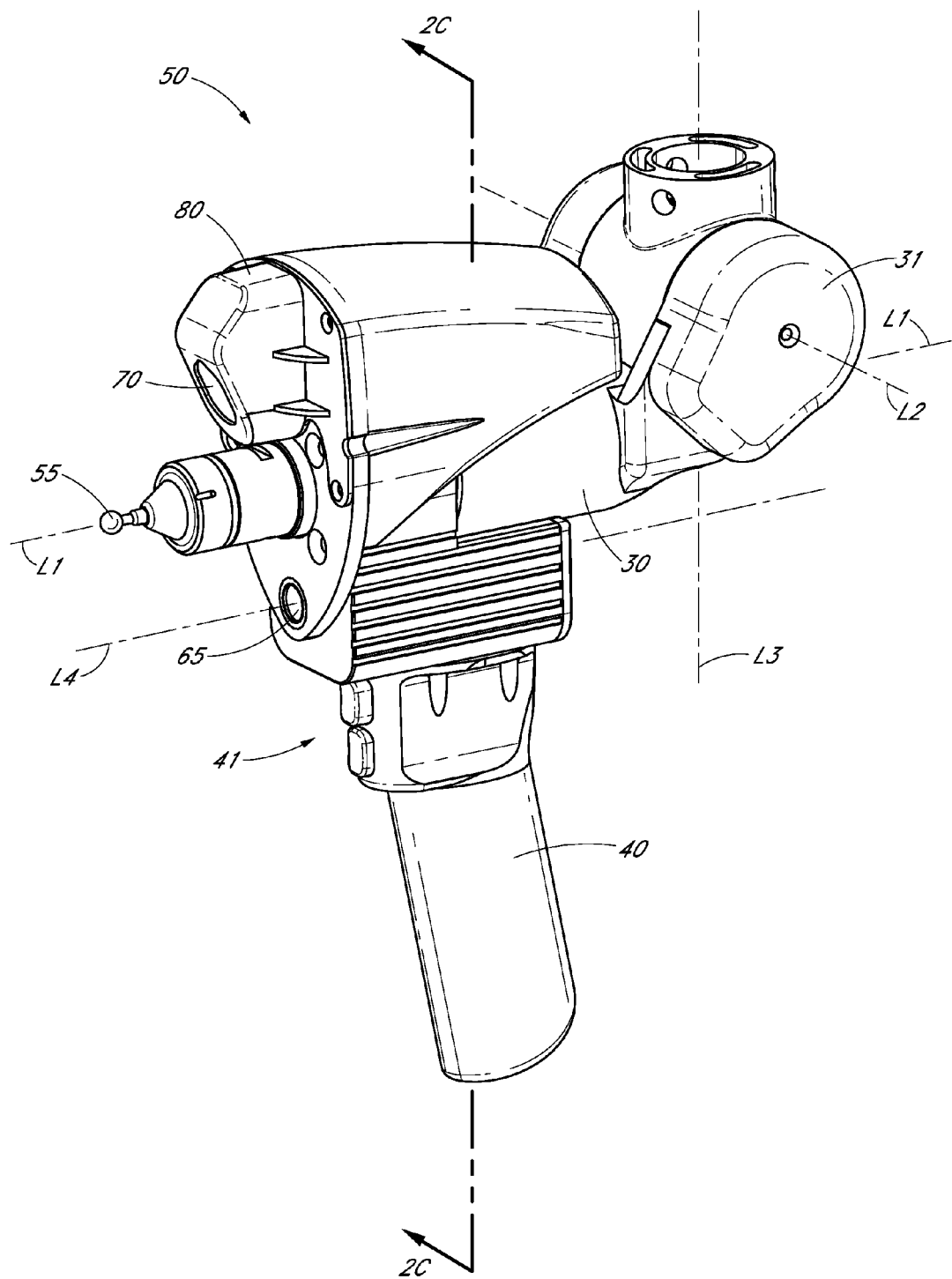
FIG. 2 is a perspective view of a coordinate acquisition member of the CMM arm of FIG. 1.
Figure 2A:
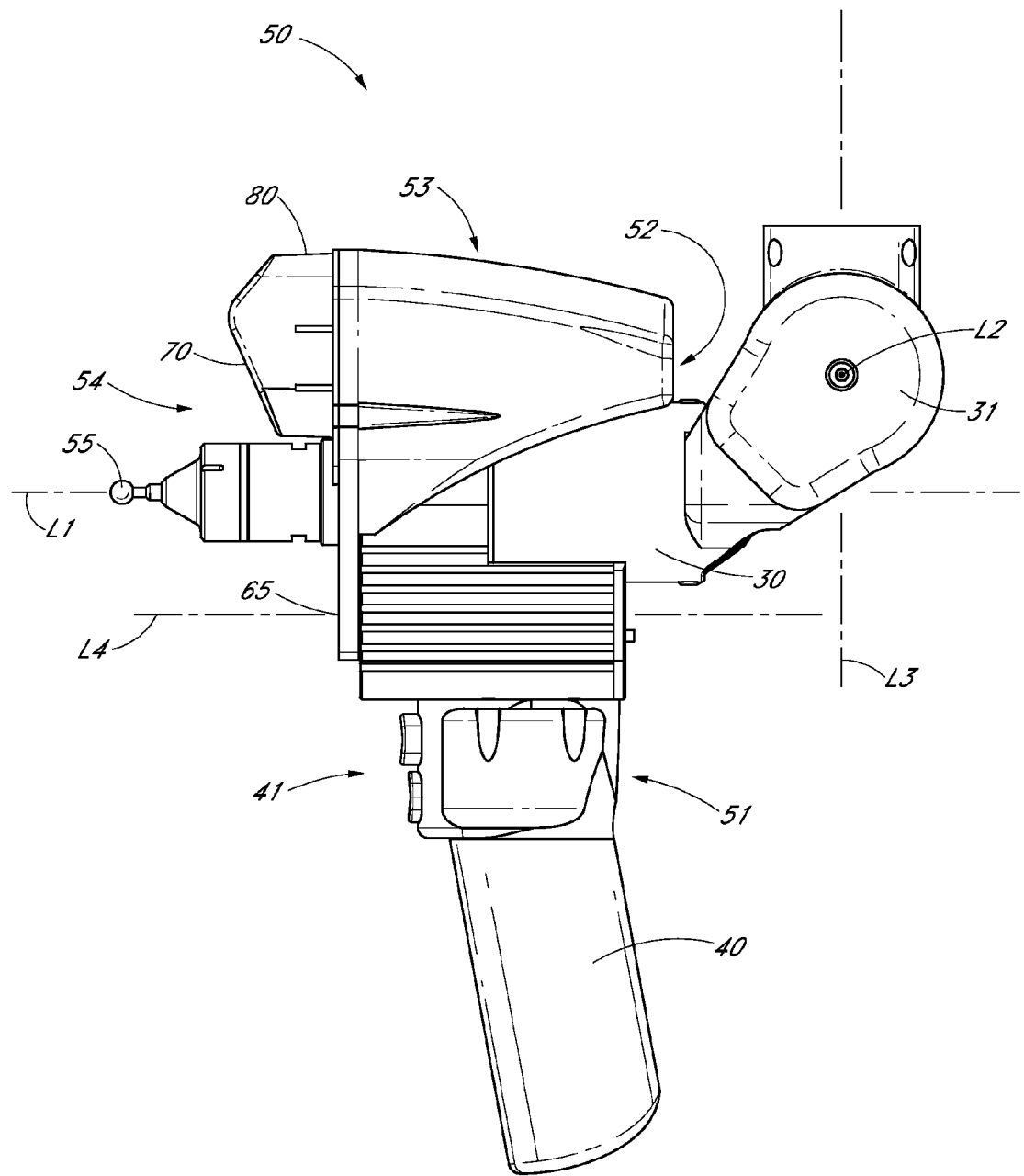
FIG. 2A is a side view of the coordinate acquisition member of FIG. 2.
Figure 2B:
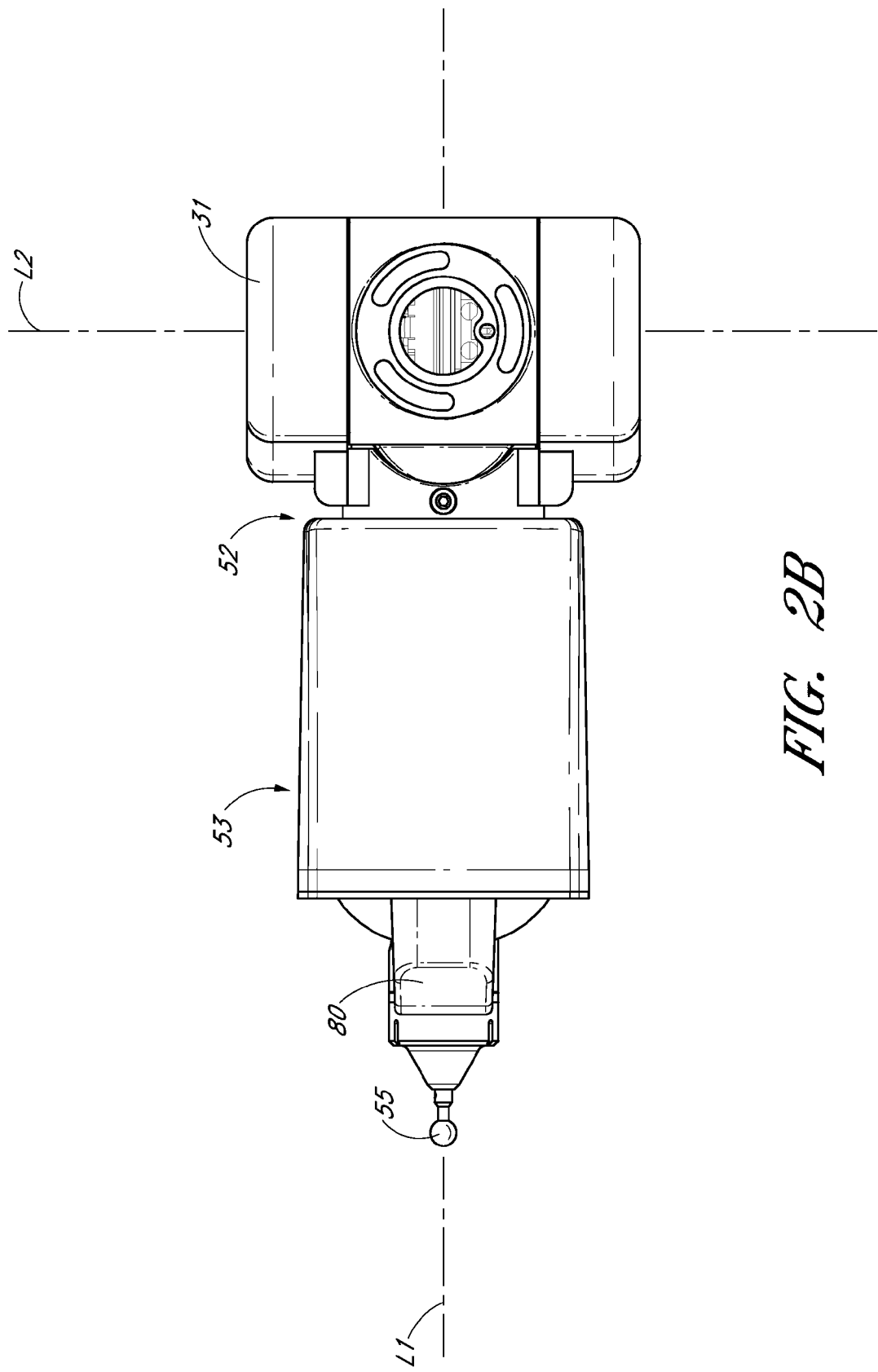
FIG. 2B is a top view of the coordinate acquisition member of FIG. 2.
Figure 3:
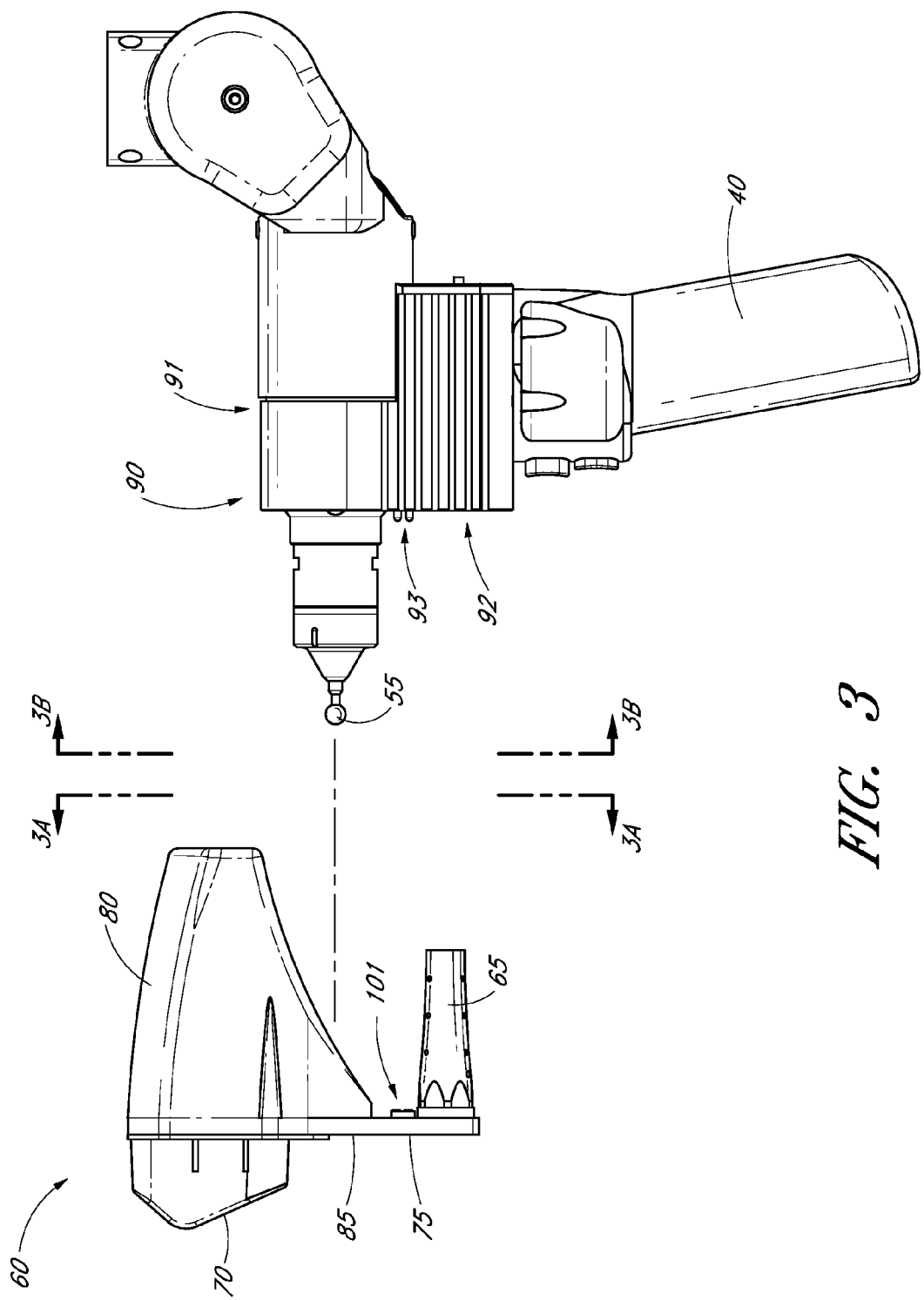
FIG. 3 is an exploded side view of the coordinate acquisition member of FIG. 2.
Figure 4A:
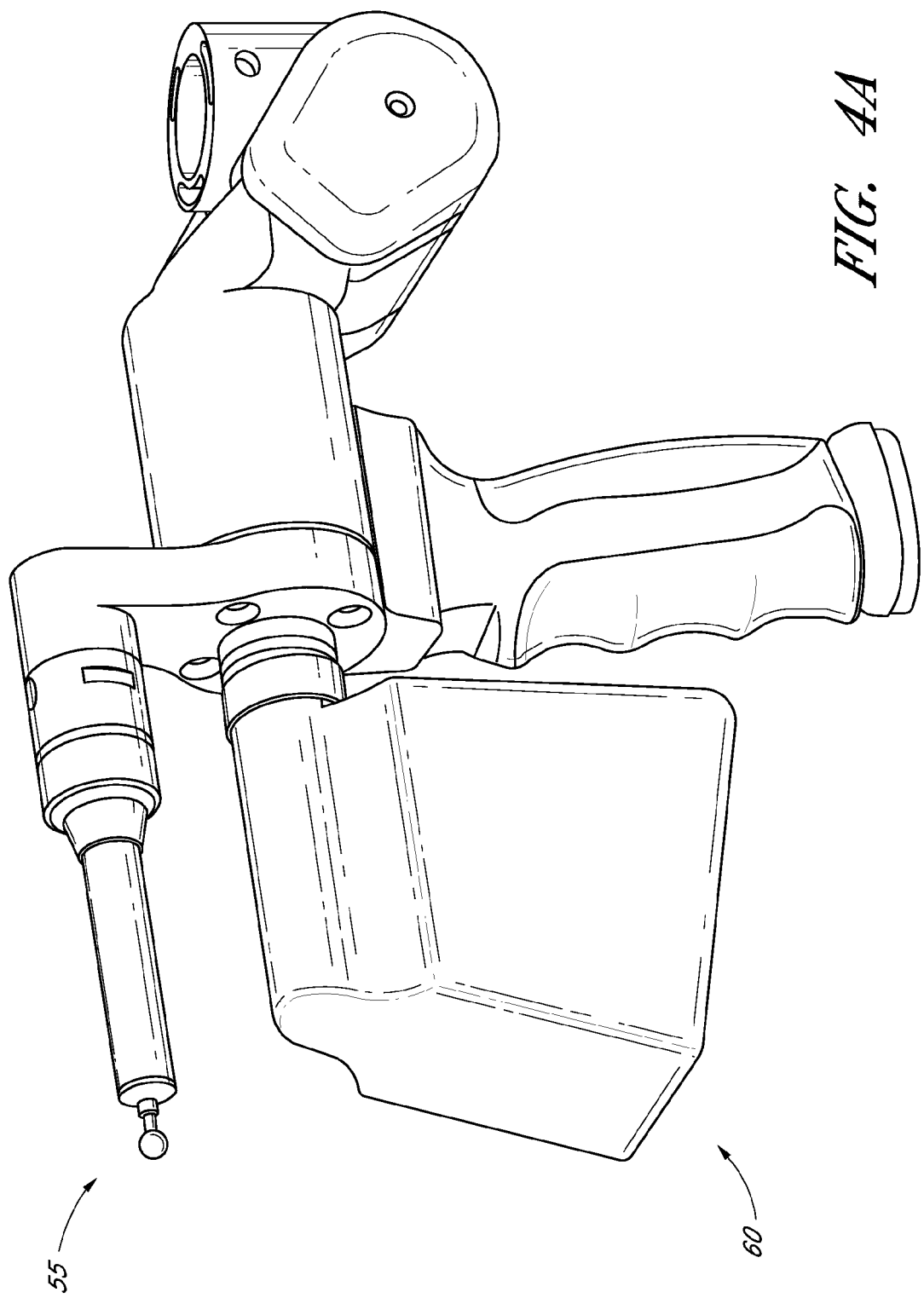
FIG. 4A depicts an alternative coordinate acquisition member.
Figure 4B:
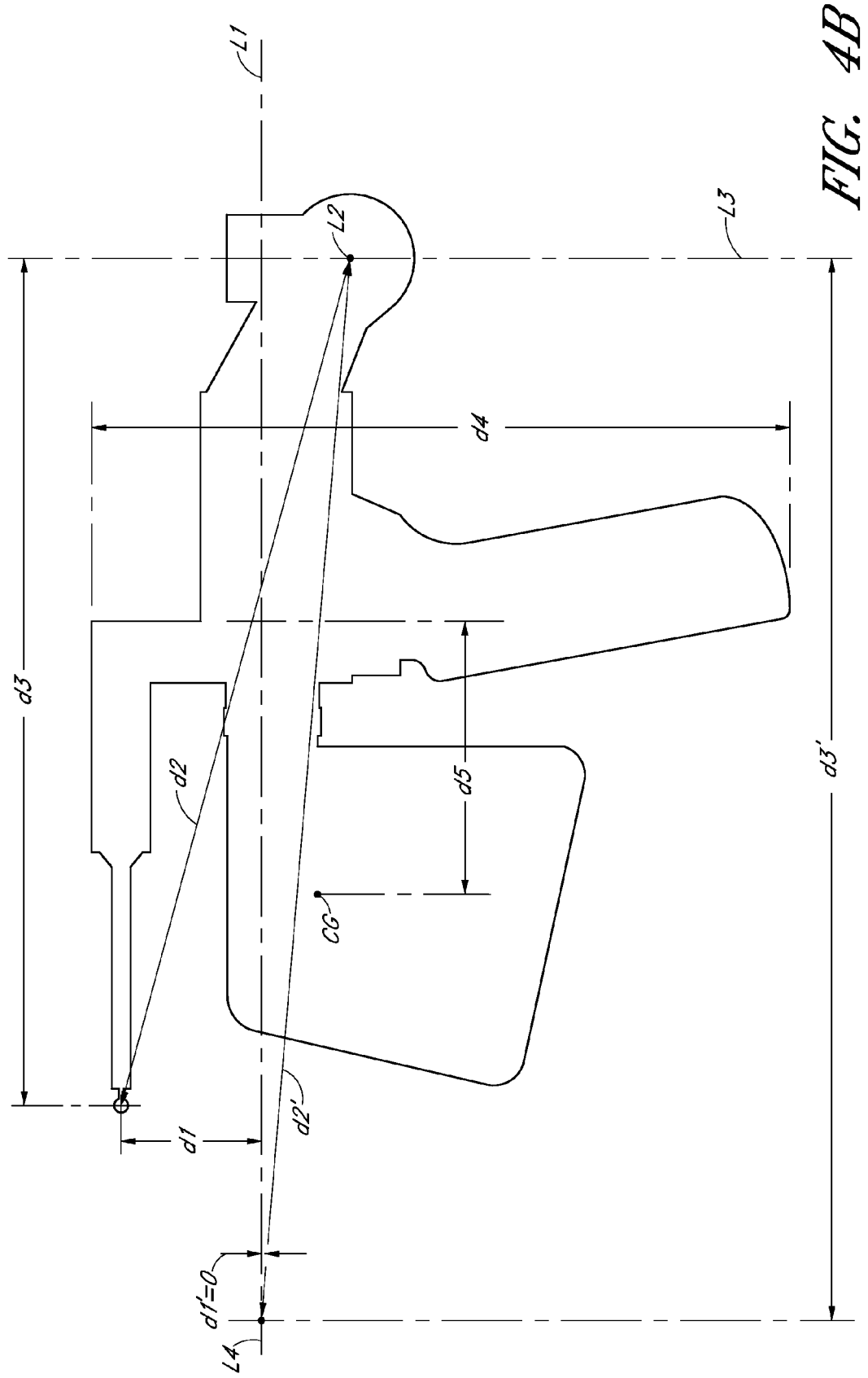
FIG. 4B depicts a side outline view of the coordinate acquisition member of FIG. 4A, indicating various dimensions.

In various embodiments, the coordinate acquisition member 50 comprises a contact sensitive member 55 (depicted as a hard probe) configured to engage the surfaces of a selected object and generate coordinate data on the basis of probe contact, as depicted in FIGS. 2-3. In the illustrated embodiment, the coordinate acquisition member 50 also comprises a non-contact scanning and detection component that does not necessarily require direct contact with the selected object to acquire geometry data. As depicted, the non-contact scanning device comprises a non-contact coordinate detection device 60 (shown as a laser coordinate detection device/laser scanner) that may be used to obtain geometry data without direct object contact. It will be appreciated that various coordinate acquisition member configurations including: a contact-sensitive probe, a non-contact scanning device, a laser-scanning device, a probe that uses a strain gauge for contact detection, a probe that uses a pressure sensor for contact detection, a device that uses an infrared beam for positioning, and a probe configured to be electrostatically-responsive may be used for the purposes of coordinate acquisition. Further, in some embodiments, a coordinate acquisition member 50 can include one, two, three, or more than three coordinate acquisition mechanisms.

With particular reference to FIG. 3, in various embodiments of the PCMM 1, the various devices which may be used for coordinate acquisition, such as the laser coordinate detection device 60, may be configured to be manually disconnected and reconnected from the PCMM 1 such that an operator can change coordinate acquisition devices without specialized tools. Thus, an operator can quickly and easily remove one coordinate acquisition device and replace it with another coordinate acquisition device. Such a connection may comprise any quick disconnect or manual disconnect device. This rapid connection capability of a coordinate acquisition device can be particularly advantageous in a PCMM 1 that can be used for a wide variety of measuring techniques (e.g. measurements requiring physical contact of the coordinate acquisition member with a surface followed by measurements requiring only optical contact of the coordinate acquisition member) in a relatively short period of time. Although, as depicted, only the laser coordinate detection device 60 is removed, in some embodiments the contact sensitive member 55 can also be removed and replaced in a similar manner.

In the embodiment of FIG. 2, the coordinate acquisition member 30 also comprises buttons 41, which are configured to be accessible by an operator. By pressing one or more of the buttons 41 singly, multiply, or in a preset sequence, the operator can input various commands to the PCMM 1. In some embodiments the buttons 41 can be used to indicate that a coordinate reading is ready to be recorded. In other embodiments the buttons 41 can be used to indicate that the location being measured is a home position and that other positions should be measured relative to the home position. In other embodiments the buttons 41 may be used to record points using the contact sensitive member 55, record points using the non-contact coordinate detection device 60, or to switch between the two devices. In other embodiments, the buttons 41 can be programmable to meet an operator's specific needs.

The location of the buttons 41 on the coordinate acquisition member 50 can be advantageous in that an operator need not access the base 10 or a computer in order to activate various functions of the PCMM 1 while using the coordinate acquisition member 50. This positioning may be particularly advantageous in embodiments of PCMM having transfer members 20 that are particularly long, thus placing the base 10 out of reach for an operator of the coordinate acquisition member 50 in most positions. In some embodiments of the PCMM 1, any number of operator input buttons (e.g., more or fewer than the two illustrated), can be provided. Advantageously, as depicted the buttons 61 are placed on the handle 40 in a trigger position, but in other embodiments it may be desirable to place buttons in other positions on the coordinate acquisition member 50 or anywhere on the PCMM 1. Other embodiments of PCMM can include other operator input devices positioned on the PCMM or the coordinate acquisition member 50, such as switches, rotary dials, or touch pads in place of, or in addition to operator input buttons.

With particular reference to FIG. 1, in some embodiments, the base 10 can be coupled to a work surface through a magnetic mount, a vacuum mount, bolts or other coupling devices. Additionally, in some embodiments, the base 10 can comprise various electrical interfaces such as plugs, sockets, or attachment ports. In some embodiments, attachment ports can comprise connectability between the PCMM 1 and a USB interface for connection to a processor such as a general purpose computer, an AC power interface for connection with a power supply, or a video interface for connection to a monitor. In some embodiments, the PCMM 1 can be configured to have a wireless connection with an external processor or general purpose computer such as by a WiFi connection, Bluetooth connection, RF connection, infrared connection, or other wireless communications protocol. In some embodiments, the various electrical interfaces or attachment ports can be specifically configured to meet the requirements of a specific PCMM 1.

With continued reference to FIG. 1, the transfer members 20 are preferably constructed of hollow generally cylindrical tubular members so as to provide substantial rigidity to the members 20. The transfer members 20 can be made of any suitable material which will provide a substantially rigid extension for the PCMM 1. The transfer members 20 preferably define a double tube assembly so as to provide additional rigidity to the transfer members 20. Furthermore, it is contemplated that the transfer 20 in various other embodiments can be made of alternate shapes such as those comprising a triangular or octagonal cross-section.

In some embodiments, it can be desirable to use a composite material, such as a carbon fiber material, to construct at least a portion of the transfer members 20. In some embodiments, other components of the PCMM 1 can also comprise composite materials such as carbon fiber materials. Constructing the transfer members 20 of composites such as carbon fiber can be particularly advantageous in that the carbon fiber can react less to thermal influences as compared to metallic materials such as steel or aluminum. Thus, coordinate measuring can be accurately and consistently performed at various temperatures. In other embodiments, the transfer members 20 can comprise metallic materials, or can comprise combinations of materials such as metallic materials, ceramics, thermoplastics, or composite materials. Also, as will be appreciated by one skilled in the art, many of the other components of the PCMM 1 can also be made of composites such as carbon fiber. Presently, as the manufacturing capabilities for composites are generally not as precise when compared to manufacturing capabilities for metals, generally the components of the PCMM 1 that require a greater degree of dimensional precision are generally made of a metals such as aluminum. It is foreseeable that as the manufacturing capabilities of composites improved that a greater number of components of the PCMM 1 can be also made of composites.

With continued reference to FIG. 1, some embodiments of the PCMM 1 may also comprise a counterbalance system 110 that can assist an operator by mitigating the effects of the weight of the transfer members 20 and the articulating members 30-36. In some orientations, when the transfer members 20 are extended away from the base 10, the weight of the transfer members 20 can create difficulties for an operator. Thus, a counterbalance system 110 can be particularly advantageous to reduce the amount of effort that an operator needs to position the PCMM 1 for convenient measuring. In some embodiments, the counterbalance system 110 can comprise resistance units (not shown) which are configured to ease the motion of the transfer members 20 without the need for heavy weights to cantilever the transfer members 20. It will be appreciated by one skilled in the art that in other embodiments simple cantilevered counterweights can be used in place or in combination with resistance units. Further, although as depicted there is only one counterbalance system 110 unit, in other embodiments there can be more.

In some embodiments, the resistance units can comprise hydraulic resistance units which use fluid resistance to provide assistance for motion of the transfer members 20. In other embodiments the resistance units may comprise other resistance devices such as pneumatic resistance devices, or linear or rotary spring systems.

As is known in the art, the position of the contact sensitive member 55 in space at a given instant can be calculated by knowing the length of each rigid transfer member 20 and the specific position of each of the articulation members 30-36. Each of the articulation members 30-36 can be broken down into a singular rotational degree of motion, each of which is measured using a dedicated rotational transducer. Each transducer outputs a signal (e.g., an electrical signal), which varies according to the movement of the articulation member in its degree of motion. The signal can be carried through wires or otherwise transmitted to the base 10. From there, the signal can be processed and/or transferred to a computer for determining the position of the coordinate acquisition member 50 and its various parts in space.

In one embodiment, the transducer can comprise an optical encoder. In general, each encoder measures the rotational position of its axle by coupling is movement to a pair of internal wheels having successive transparent and opaque bands. In such embodiments, light can be shined through the wheels onto optical sensors which feed a pair of electrical outputs. As the axle sweeps through an arc, the output of the analog encoder can be substantially two sinusoidal signals which are 90 degrees out of phase. Coarse positioning can occur through monitoring the change in polarity of the two signals. Fine positioning can be determined by measuring the actual value of the two signals at the instant in question. In certain embodiments, maximum accuracy can be obtained by measuring the output precisely before it is corrupted by electronic noise. Additional details and embodiments of the illustrated embodiment of the PCMM 1 can be found in U.S. Pat. No. 5,829,148, the entirety of which is hereby incorporated by reference herein.

With reference to FIGS. 1, 1A, and 1B, in some embodiments, the PCMM 1 can comprise one or more rotatable grip assemblies 122, 124. In the illustrated embodiment, the PCMM 1 can comprise a lower rotatable grip assembly 122 and an upper rotatable grip assembly 124. Advantageously, having a lower rotatable grip assembly 122 and an upper rotatable grip assembly 124 disposed on a last transfer member 21, allows the operator to easily use both hands in positioning the PCMM 1. In other embodiments, the PCMM 1 can comprise one, or more than two rotatable grips. Additional details of the grip assemblies can be found in Applicant's co-pending U.S. patent application Ser. No. 12/057,966, filed Mar. 28, 2008, the entirety of which is hereby incorporated by reference herein While several embodiments and related features of a PCMM 1 have been generally discussed herein, additional details and embodiments of PCMM 1 can be found in U.S. Pat. Nos. 5,829,148 and 7,174,651, the entirety of these patents being incorporated by reference herein. While certain features below are discussed with reference to the embodiments of a PCMM 1 described above, it is contemplated that they can be applied in other embodiments of a PCMM such as those described in U.S. Pat. Nos. 5,829,148 or 7,174,651, U.S. patent application Ser. No. 11/963,531, filed Dec. 21, 2007, entitled "IMPROVED JOINT AXIS FOR COORDINATE MEASUREMENT MACHINE", U.S. patent application Ser. No. 11/943,463, filed Nov. 20, 2007, entitled "COORDINATE MEASUREMENT DEVICE WITH IMPROVED JOINT" and U.S. patent application Ser. No. 11/775,081, filed Jul. 9, 2007, entitled "JOINT FOR COORDINATE MEASUREMENT DEVICE", the entire contents of these patents and patent applications being incorporated herein by reference.

As depicted in FIG. 1, the PCMM can include a coordinate acquisition member 50 at an end of its arm. FIGS. 2-3 depict the coordinate acquisition member 50 in more detail. As shown, the coordinate acquisition member 50 can include a contact sensitive member 55 and a laser coordinate detection device 60 facing a front end 54. The coordinate acquisition member 50 can further attach to a handle 40 at a lower end 51 and the PCMM 1 at a rear end 52. The coordinate acquisition member 50 can further include a top end 53. At the rear end 52, the coordinate acquisition member 50 can further include a data connection (not shown) with the hinge 31, such as a slip ring connection, a direct wire, or some other connection. This can allow data transfer between the coordinate acquisition member 50 and the PCMM 1. The PCMM 1 can include similar data transfer elements along its arm, allowing data transmission between the coordinate acquisition member 50 and the base 10, or any peripheral computing medium external to the PCMM arm.

The laser coordinate detection device 60 can include a light source 65 (depicted as a laser) and an optical sensor 70 (depicted as a camera), and can acquire positional data by a method of triangulation. The laser or light source 65 can create an illuminated laser plane including a laser line L4. The camera 70 can be displaced from the laser plane and further be non-parallel to the laser plane. Accordingly, the camera 70 will view points as higher or lower, depending on their position further or closer to the laser 65. Similarly, the camera 70 will view points illuminated by the laser as being either further to the left or the right, according to their actual position relative to the laser 65. Comparing the geometric relationship between the position and orientation of the laser 65 and the camera 70 will allow one of skill in the art to appropriately translate the position of the image of the laser-illuminated point in the image captured by the camera 70 to an actual position in space in conjunction with the position of the coordinate acquisition member 50 itself.

Figure 2C:
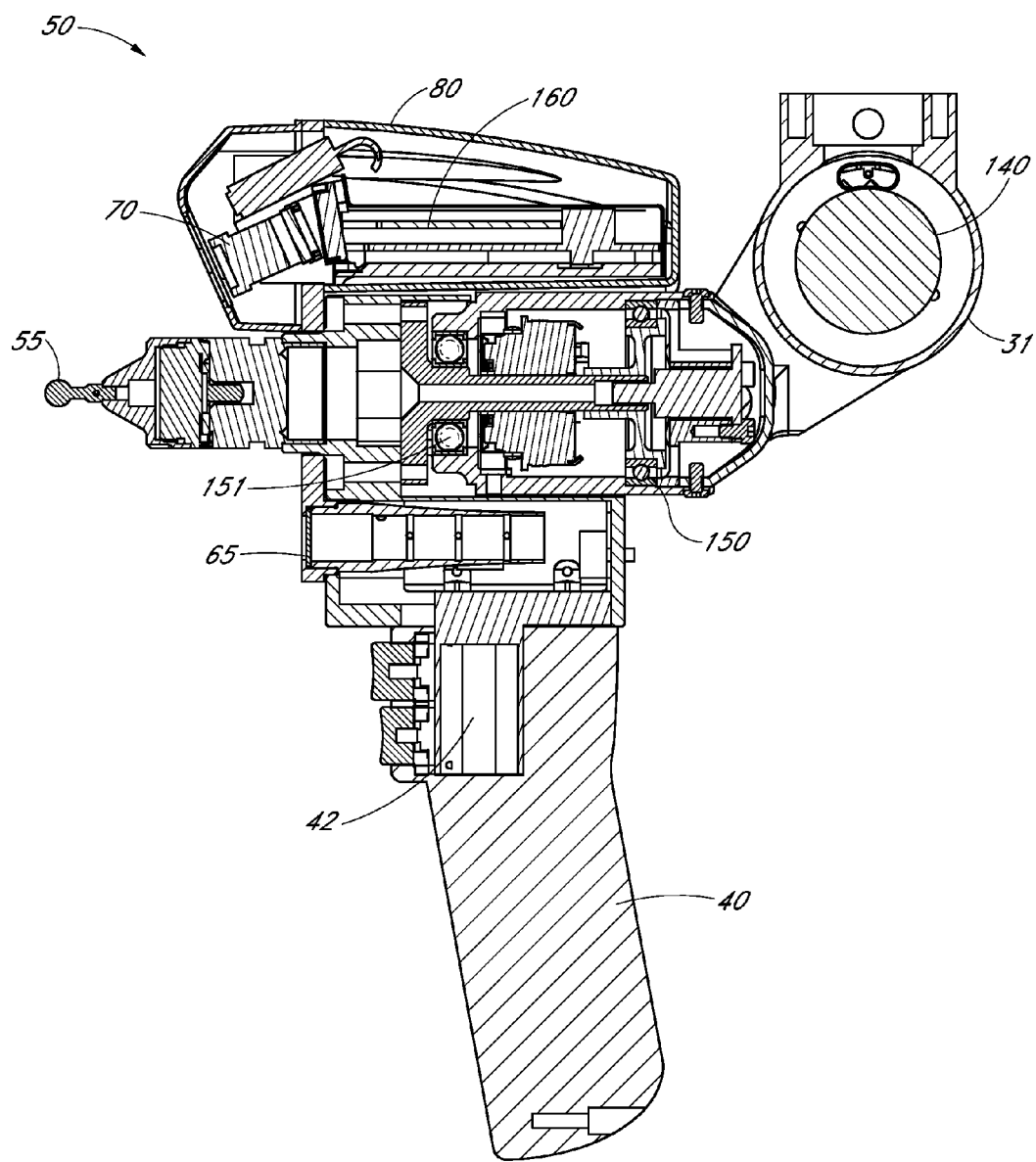
FIG. 2C is a side cross-sectional view of the coordinate acquisition member of FIG. 2, at 2C-2C.

In FIG. 1, a plurality of the axes of movement are marked according to their proximity to the coordinate acquisition member 50. As depicted, the coordinate acquisition member 50 can pivot about a last axis of rotation L1 on a swivel 30. The last axis of rotation L1 and the swivel 30 are more clearly depicted in FIG. 2C. As shown, the laser coordinate detection device 60 mounts bearings 150, 151 at an end of the PCMM arm 1. The orientation and position of the bearings 150, 151 can substantially define the last axis L1. Thus, the laser coordinate detection device 60 can rotate about the last axis L1, independent of the contact sensitive member (depicted as a probe) 55. In some embodiments, the contact sensitive member 55 is not rotatable, reducing potential error from any eccentricity between the contact sensitive member 55 and the last axis L1. The swivel 30 can rotate about a second to last axis of rotation L2 at the end of the last rigid transfer member 21 on a hinge joint 31. Like the bearings 150, 151 and the last axis L1, the second to last axis L2 can be substantially defined by a hinge shaft 140. As depicted, the last axis L1 can also be considered a roll axis, and the second to last axis can also be considered a pitch axis. Similarly, rotation about a third to last axis L3 can be considered a yaw axis.

The handle 40 can also generally comprise a pistol-grip style, which can further include ergonomic grooves corresponding to human fingers (not shown). The handle can also have a generally central axis L5. Optionally, within the handle 40, a battery 42 can be held. In some embodiments the handle 40 can include a sealed battery, as described in U.S. Publication No. 2007/0256311A1, published Nov. 8, 2007, which is incorporated by reference herein in its entirety. Further, the battery 42 can insert through the bottom of the handle 40. In other embodiments, the battery 42 can insert through the top of the handle 40, and the handle 40 can release from the coordinate acquisition member 50 to expose an opening for battery insertion and removal. The battery can be provided to power the laser scanner, rotational motors about one of the articulation members 30-36, and/or other types of probes or devices. This can reduce current draw through the arm, decrease overall power requirements, and/or reduce heat generated in various parts of the arm.

In one embodiment, data can be transmitted wirelessly to and from either the coordinate acquisition member 50 or the non-contact coordinate detection device 60 and the base of the PCMM 1 or to an external device such as a computer. This can reduce the number of internal wires through the PCMM 1. It can also reduce the number of wires between the PCMM 1 and the computer.

Above the handle 40, the coordinate acquisition member 50 can include a main body 90, best depicted in FIG. 3. The main body 90 can connect directly to the hinge 31 at the rear end 52 of the coordinate acquisition member 50. The main body 90 can further hold the contact sensitive member 55. In preferred embodiments, the main body 90 can even further hold the contact sensitive member 55 in near alignment with the swivel 30, such that an axis of the contact sensitive member 55 extends near the last axis L1 of the swivel 30. In some embodiments, the axis of the contact sensitive member 55 can pass through the last axis L1 of the swivel 30. In other embodiments the axis of the contact sensitive member 55 can pass within 10 mm of the last axis L1, this distance corresponding to D3 (depicted in FIG. 2D).

As best depicted in FIG. 3B, the main body 90 can further include a mounting portion 91, a recess 92, and a data port 93, configured to interact with a laser coordinate detection device (depicted as a laser scanner) 60. The laser scanner 60, as best depicted in FIG. 3A, can include an upper housing 80, a laser 65, and a data port 101. As shown in FIG. 3, the laser scanner 60 can be configured to mount on the main body 90 as an auxiliary body (which can include different devices in other embodiments). The upper housing 80 can be shaped to match the mounting portion 91, and can accordingly be received by that portion. The recess 92 can be shaped to receive the laser 65 when the mounting portion 91 receives the upper housing 80. Upon these interactions, the data ports 93, 101 can interact to pass information between the main body 90 and the laser scanner 60 (and accordingly further along the PCMM arm 1 as described above). The laser coordinate detection device 60 can further include a base-plate 75. The base-plate 75 can include a port 85 configured to receive the contact sensitive member 55 when the laser scanner 60 mounts to the main body 90. Additionally, the base-plate 75 can include assembly holes 104 that can interact with assembly holes 94 on the main body 90, along with fasteners (not shown), to secure the main body 90 and laser scanner 60 together. It will be clear that a variety of screws and other fasteners can be used to attach the main body 90 and the laser scanner 60. For example, in some embodiments they can be attached by a snap-lock mechanism, allowing easy attachment and removal. Further, in some embodiments a repeatable kinematic mount can be used, where the laser scanner 60 can be removed and remounted to the main body 90 without tools. It can be remounted with a high level of repeatability through the use of a 3-point kinematic seat as is known in the industry.

Figure 2D:
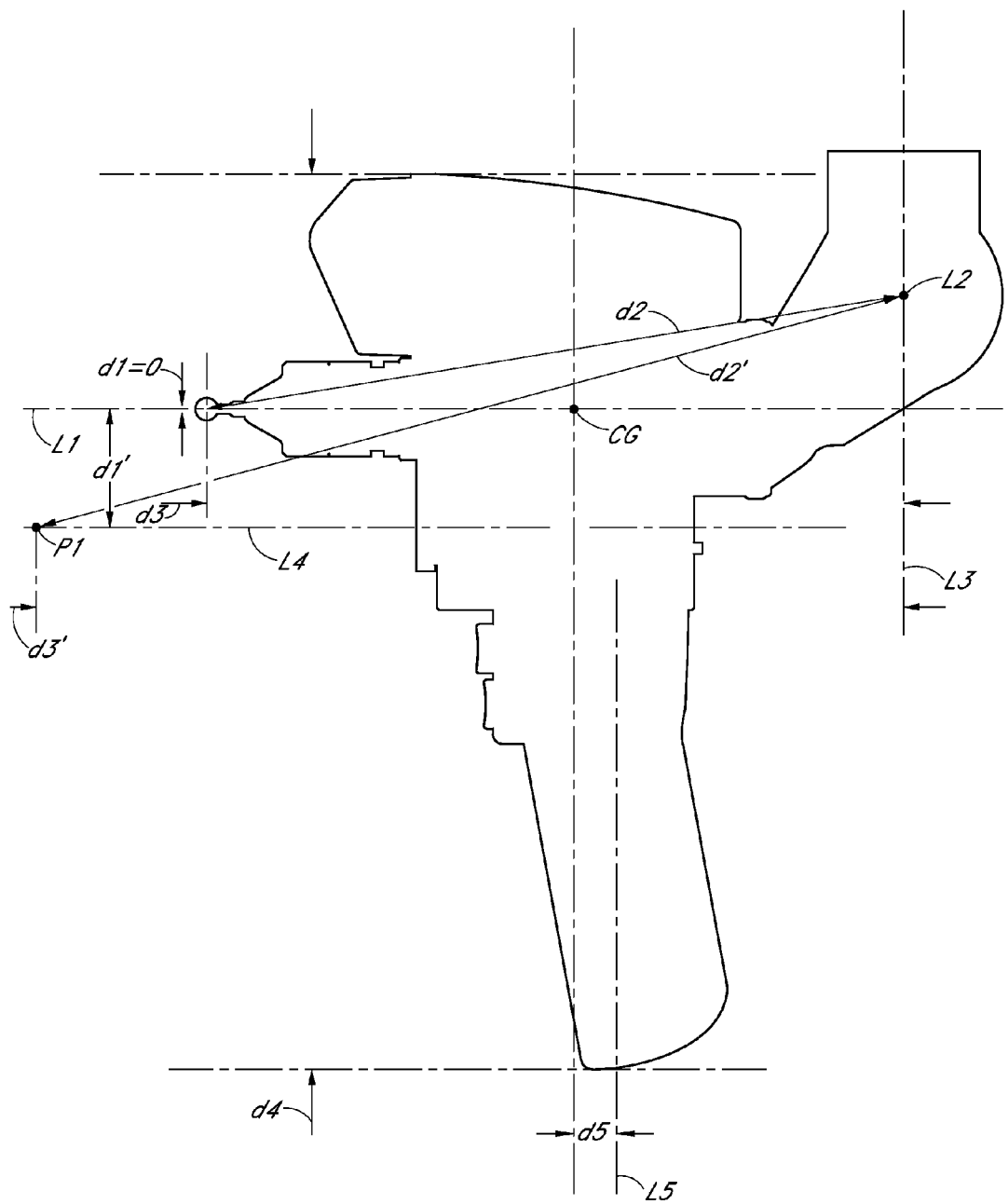
FIG. 2D is a side outline view of the coordinate acquisition member of FIG. 2, indicating various dimensions.

When the PCMM 1 is intended to provide accurate position data, the PCMM can be designed to minimize the errors at both the contact sensitive member 55 and at the non-contact coordinate detection device 60. The error of the coordinate acquisition member 50 can be reduced by minimizing the effect of the errors of the last three axes on both the contact sensitive member 55 and the non-contact coordinate detection device 60. The maximum error of the contact sensitive member 55 can be represented in the following equations as Ep, which is primarily a function of the errors of each of the last three axes (L1-L3) and the distances from the probe center to the axes. Likewise, the error of the non-contact coordinate detection device 60 can be represented as Es and is primarily a function of the errors of each of the last three axes (L1-L3) and the distances from the optical center point P1 to the axes.

$$Ep=(d1*e1)+(d2*e2)+(d3*e3)$$

$$Es=(d1'*e1)+(d2'*e2)+(d3'*e3)$$

Where e1, e2, and e3 represent the absolute value of the angular error at each of the three last axes of rotation at the articulation members 30, 31, and 32 respectively; and d1, d2, d3, d1', d2', and d3' represent the distance from the respective axes to either the probe center or the optical center point (or laser focus) P1. As will be explained in further detail to follow, the PCMM 1 can enhance the accuracy of the coordinate acquisition member 50 by supplying a superior geometry to reduce both errors Ep and Es while at the same time balancing the Center of Gravity (CG) of the coordinate acquisition member 50 over the handle 40 and reducing the overall height of the coordinate acquisition member 50 (d4) as shown in FIG. 2D.

When the laser scanner 60 mounts the main body 90, a variety of geometric properties can arise between coordinate acquisition elements. For example, as depicted the camera 70, the contact sensitive member 55, and the laser 65 can be directly integrated with the last axis L1. For example, as depicted the camera 70, contact sensitive member 55, and laser 65 can be generally collinear when viewing from the front (e.g. along axis L1), with the contact sensitive member 55 in the middle and aligned with the last axis L1 (i.e. d1=0). Further, as depicted the upper housing 80, contact sensitive member 55, and the laser 65 can be arranged generally parallel to the last axis L1. However, the camera 70 can be oriented at an angle relative to the last axis L1 so as to view the laser plane.

Such arrangements can be advantageous in a number of ways. For example, in this arrangement the angular position of the elements about L1 can be approximately equal (with the exception of a 180 degree offset when on different sides of the last axis L1), simplifying data processing requirements. As another example, providing these elements aligned with the last axis L1 can facilitate counterbalancing the weight of these elements about the last axis, reducing error from possible deflection and easing movement about the axis. As depicted in FIG. 2D, the center of gravity (CG) of the coordinate acquisition member 50 can lie along L1. Even further, the error associated with the angle of rotation about the last axis L1 is amplified by the perpendicular distance from the axis to the center of the laser plane emitted by the laser 65 (depicted as d1' in FIG. 2D). In this orientation, the perpendicular distance is minimized. In some embodiments, the perpendicular distance from the center of the laser plane to the last axis can be no greater than 35 mm. Notably, in other embodiments it may be desirable to move the laser 65 even closer to the last axis L1, such as by aligning directly therewith. However, the accuracy of the contact sensitive member 55 is also partially dependent on its proximity to the last axis L1; and, as described below, some other advantages can arise from separating the laser 65 from the camera 70.

As further depicted, when the laser scanner 60 mounts the main body 90, the contact sensitive member 55 and the laser coordinate detection device 60 can form a compact design. For example, the laser 65 and/or the camera 70 can extend past the one or both of the bearings 150, 151. As depicted, the laser 65 extends, at least partially, beyond the bearings 151 but not the bearings 150; and the camera 70 extends beyond both bearings. In other embodiments, these elements can extend to the bearings, and not pass them. Generally, causing these elements to overlap reduces the necessary length of the coordinate acquisition member 50.

In some embodiments such compact designs can allow the coordinate acquisition elements to be closer to the second to last axis L2, as well as the last axis L1. Accordingly, the distance between the second to last axis L2 and the points of measurement (e.g. at the tip of the contact sensitive member 55 and/or at the focus P1 of the camera 70) can be reduced. As the error in the angular position of the coordinate acquisition member 50 along the second to last axis L2 is amplified by these distances, this also reduces the error of the PCMM 1 in other ways. For example, the compact design can also reduce error related to the distance from the focus P1 to the third to last axis L3, represented as d3'. Additionally, providing the elements of the coordinate acquisition member 50 closer to the second and third to last axes L2, L3 can reduce deflection, reducing error even further. In some embodiments the contact sensitive member 55 can be within 185 mm of the second and/or third to last axis L2, L3, and the focus P1 of the camera 70 can be within 285 mm of the third to last axis. As best depicted in FIG. 2D, the compact design can further bring a center of gravity (CG) of the coordinate acquisition member 50 closer to a central axis L5 of the handle 40. In some embodiments, the distance between the center of gravity and the central axis of the handle 40 can be no greater than 20 mm. As yet another advantage to the compact design, the vertical height d4 of the coordinate acquisition member 50 can be reduced, allowing measurement in tighter spots. In some embodiments the height can be no greater than 260 mm.

Notably, as the coordinate acquisition member 50 in the depicted embodiment rotates about the last axis L1, the height d4 can also represent a maximum length of the coordinate acquisition member 50.

In some embodiments, the laser scanner 60 can include additional advantages. For example, the laser scanner 60 can isolate the laser 65 from heat generated by the other parts of the PCMM arm 1. For example, as depicted in FIG. 3, a base plate 75 holds the laser 65 at one end and the camera 70 at the other, separated by the contact sensitive member 55. In some embodiments the base plate 75 can include a material with a low coefficient of thermal expansion such as Invar, Ceramic, or Carbon Fiber. Reducing thermal expansion can reduce changes in the position and orientation of the laser 65 and/or the camera 70, which could create problems such as introducing additional error into the measurements. Similarly, the base plate 75 can also include a material with a low thermal conductivity, hindering transmission of heat, for example, from the camera 70 to the laser 65 or PCMM 1.

As depicted, the camera 70 can be held in an upper housing 80 of the laser scanner 60, and in some embodiments the upper housing can include multiple cameras. The upper housing 80 can include materials such as aluminum or plastic. Additionally, the upper housing 80 can protect the camera 70 from atmospheric contaminants such as dust, liquids, ambient light, etc. Similarly, the laser 65 can be protected by the recess 92 of the main body 90. In some embodiments, the recess 92 can include a thermal isolation disc or plate with a low coefficient of thermal expansion and/or conductivity, protecting the laser from external heat and substantially preserving its alignment.

In many embodiments, the electronics 160 associated with the laser coordinate detection device 60 can create a substantial amount of heat. As discussed above, various components can be protected from this heat with materials having low coefficients of thermal expansion and conductivity for example. As depicted, the electronics 160 can be positioned in the upper housing 80 of the laser scanner 60.

However, in other embodiments the electronics 160 can be positioned further from the sensors 55, 60, such as in a completely separate housing. For example, in some embodiments the electronics 160 can be held by the laser scanner 60 in a separate housing, also attached to the base plate 75. In other embodiments, the electronics 160 can be located further down the PCMM 1, such as in a rigid transfer member 20 or in the base 10. Moving the electronics 160 further down the PCMM 1 can reduce weight at the end of the arm, minimizing deflection of the arm. Similarly, in some embodiments the electronics 160 can be completely outside the PCMM 1, such as in a separate computer. Data from the sensors 55, 70 can be transmitted through the PCMM 1 on an internal cable in the arm, wirelessly, or by other data transmission methods. In some embodiments, data ports 93, 101 can include spring loaded pins such that no cables are externally exposed.

As another advantage of the depicted embodiment, the depicted layout of the system can use a smaller volume. The laser coordinate detection device 60 can sometimes operate on a theory of triangulation. Accordingly, it may be desirable to leave some distance between the laser 65 and the camera 70. The depicted embodiment advantageously places the contact sensitive member 55 within this space, reducing the volume of the coordinate acquisition member 50. Additionally, the last axis L1 also passes through this space, balancing the system and reducing the coordinate acquisition member's 50 rotational volume. In this configuration, the combination of axis and laser scanner can further be uniquely optimized to reduce weight, as the more compact design reduces deflection, and accordingly reduces the need for heavy-load bearing materials.

To further illustrate the advantages of the above-described embodiments, FIGS. 4-7 depict modified configurations in which the laser scanner and or image sensor is positioned in different locations. In FIGS. 4A, 4B, the scanner is centered on the last axis, displacing the contact sensitive member, and is further forward. Accordingly, d1' has been reduced to zero, but d1 has increased, essentially transferring error from the non-contact measuring device to the contact measuring device. Additionally, in this embodiment, both the measuring devices 55, 60 are further from the second and third to last axes L2, L3, increasing d2, d2', d3, and d3'. Even further, as the center of gravity CG is displaced forward, away from the handle's axis L5, the coordinate acquisition member can be more difficult to maneuver as d5 is larger, and can further suffer greater deflection.

Figure 5A:
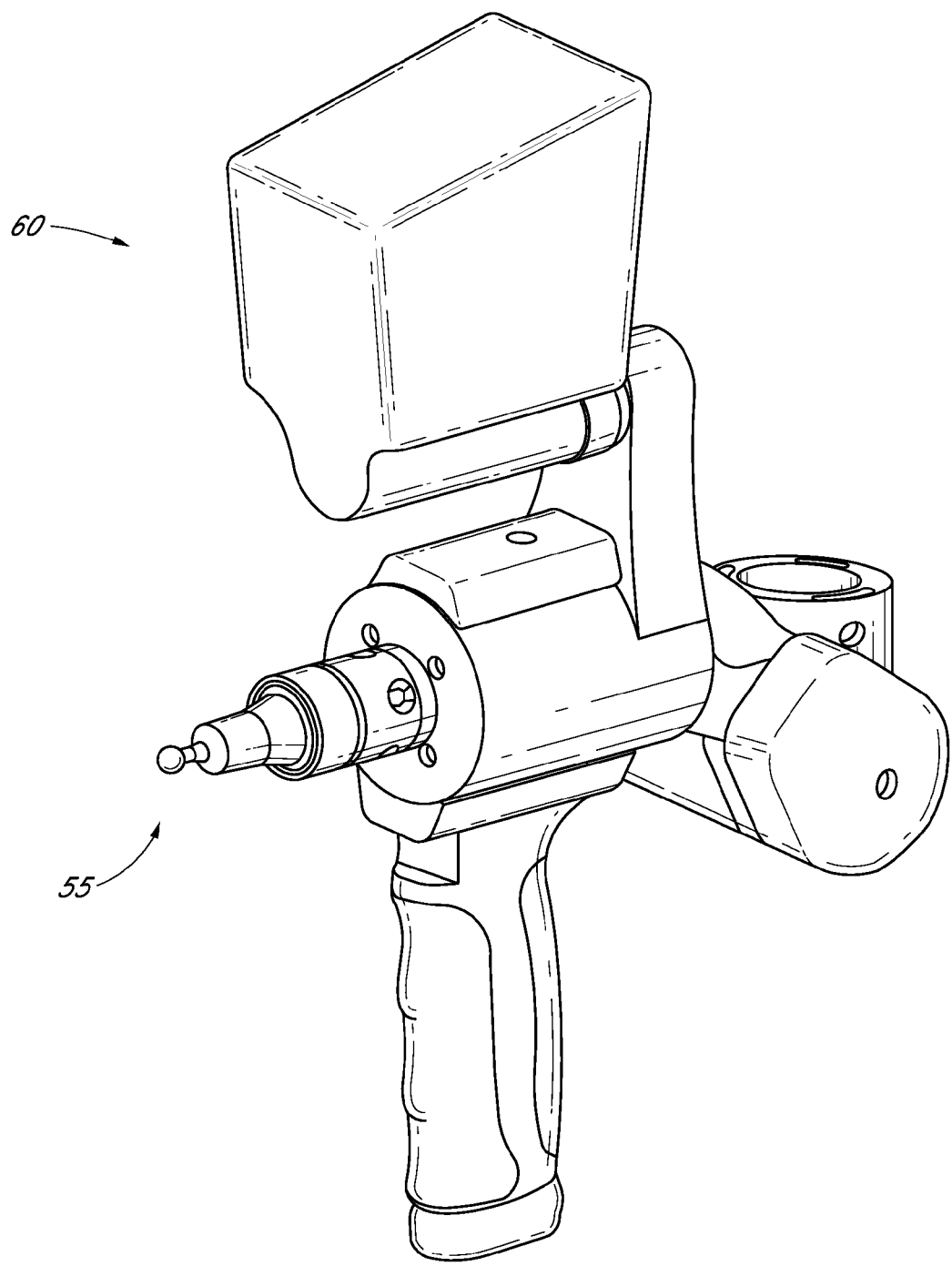
FIG. 5A depicts an alternative coordinate acquisition member.
Figure 5B:
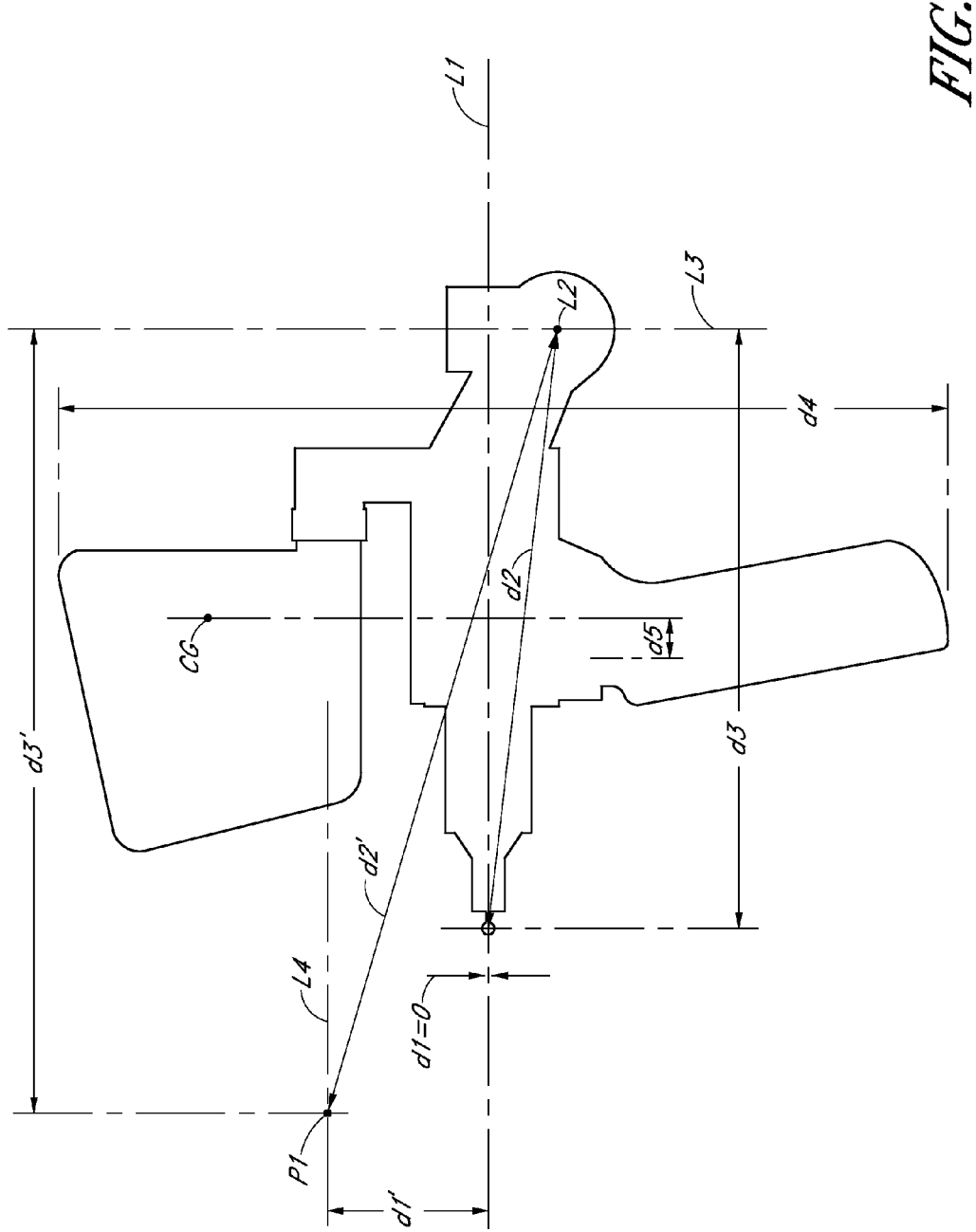
FIG. 5B depicts a side outline view of the coordinate acquisition member of FIG. 5A, indicating various dimensions.

In FIGS. 5A, 5B, the scanner is above the last axis. Accordingly, there is a large distance between the last axis and the laser area (d1') as well as a larger maximum length d4 of the coordinate acquisition member 50. Further, displacing the center of gravity CG from the last axis L1 can hinder the maneuverability of the coordinate acquisition member 50. Additionally, the scanner is slightly more forward, increasing the distance from the focus P1 to the second and third to last axes (d3').

Figure 6A:
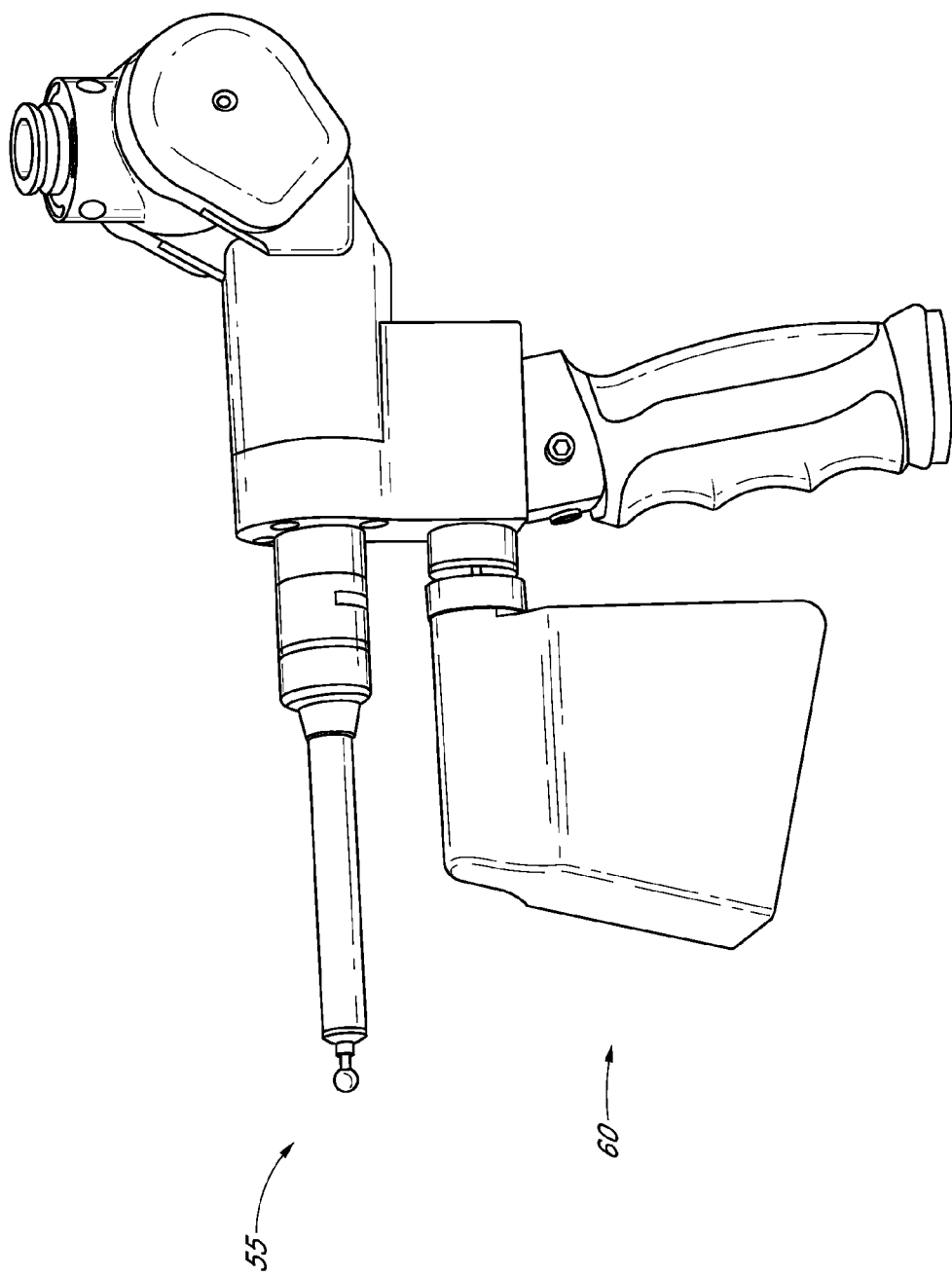
FIG. 6A depicts an alternative coordinate acquisition member.

In FIGS. 6A, 6B, the scanner is further forward and below the last axis. Accordingly, there is a large distance between the last axis and the laser area (d1') and a similarly large distance between the second and third to last axes and the scanner's focus P1 (d3'). Further, the center of gravity CG is displaced from the last axis L1 and the handle (d5), hindering the maneuverability of the coordinate acquisition member 50.

Figure 7A:
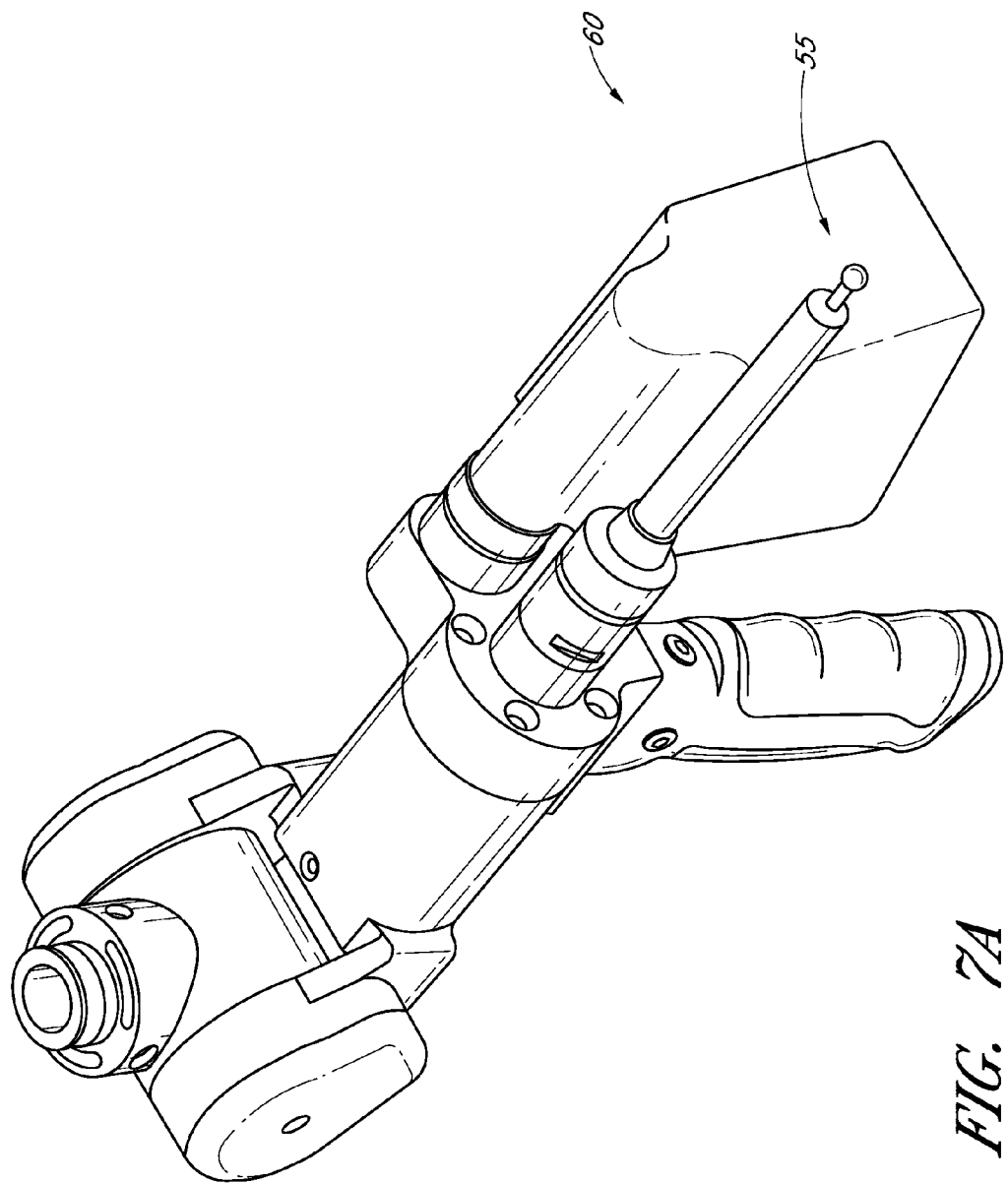
FIG. 7A depicts an alternative coordinate acquisition member.

In FIG. 7A, 7B, 7C, with the scanner off to the side of the last axis, there is a large distance between the last axis and the laser area (d1'), and a large distance between the second and third to last axes and the scanner's focus P1 (d3'). Further, displacing the center of gravity CG from the last axis L1 and the handle's axis L5 can hinder the maneuverability of the coordinate acquisition member 50.

The various devices, methods, procedures, and techniques described above provide a number of ways to carry out the invention. Of course, it is to be understood that not necessarily all objectives or advantages described may be achieved in accordance with any particular embodiment described herein. Also, although the invention has been disclosed in the context of certain embodiments and examples, it will be understood by those skilled in the art that the invention extends beyond the specifically disclosed embodiments to other alternative embodiments and/or uses and obvious modifications and equivalents thereof Accordingly, the invention is not intended to be limited by the specific disclosures of preferred embodiments herein.

What is claimed is:

1. An optical position acquisition member comprising:
   a base plate comprising an opening configured to receive a CMM measuring probe;
   a laser mounted on the plate; and
   an optical sensor mounted on the plate such that the sensor is generally collinear with the laser and the opening, and the opening is between the laser and the sensor.

2. The acquisition member of claim 1, wherein the base plate comprises a material selected from the group consisting of invar, ceramic, steel, aluminum, plastic, or a carbon composite.

3. The acquisition member of claim 1, wherein the laser is within 100 mm of a center of the opening.

4. The acquisition member of claim 1, further comprising a first housing mounted on the base plate and substantially enclosing the optical sensor.

5. The acquisition member of claim 1, wherein two or more optical sensors are mounted to the base plate.

6. The acquisition member of claim 4, further comprising electronics in the first housing, operatively connected to the optical sensor.

7. The acquisition member of claim 6, wherein the electronics are thermally isolated from the laser.

8. The acquisition member of claim 1, wherein the base plate is configured to rotatably mount to the probe, such that the base plate can rotate independent of the probe.

9. An articulated arm CMM comprising:
an articulated arm comprising a plurality of articulated arm members, a measuring probe, a receiving portion at a distal end, and a base at a proximal end; and
a base plate mounted on the receiving portion, the plate comprising a hole positioned such that the measuring probe passes through the hole, the base plate coupled to a laser and an optical sensor located on opposite sides of the hole.

10. The CMM of claim 9, wherein the articulated arm further comprises a last axis of rotation, the laser being oriented generally parallel to the last axis of rotation and within 100 mm of the last axis of rotation.

11. The CMM of claim 9, wherein the articulated arm further comprises a second to last axis of rotation and the optical sensor further comprises a focus, the focus being within 100 mm of the second to last axis of rotation.

12. The CMM of claim 9, wherein two or more optical sensors are mounted to the baseplate.

13. The CMM of claim 9, wherein the receiving portion comprises bearings and at least a portion of the laser or the optical sensor overlaps the bearings.

14. The CMM of claim 9, wherein the base plate is rotatably mounted on the receiving portion such that it is rotatable independent of the probe.

15. A coordinate measurement device comprising:
an articulated arm having a first end, a second end, and a plurality of jointed arm segments therebetween, each arm segment defining at least one axis of rotation, a last axis of rotation being defined by bearings near a distal end of the arm; and
a laser scanner assembly coupled to the second end of the arm and rotatable about the last axis of rotation of the articulated arm, the laser scanner assembly comprising a laser and an image sensor, the laser positioned on an opposite side of the last axis of rotation from the image sensor, and at least one of the laser and image sensor overlaps the bearings.

16. The coordinate measurement device of claim 15, further comprising a probe positioned between the laser and image sensor.

17. The coordinate measurement device of claim 16, wherein the probe is a touch probe.

18. The coordinate measurement device of claim 16, wherein the probe is positioned substantially along the last axis of rotation.

19. The coordinate measurement device of claim 15, where the laser and image sensor are mounted to a common plate.

20. The coordinate measurement device of claim 19, wherein the common plate is made of Invar.

21. The coordinate measurement device of claim 19, wherein the common plate includes an opening through which the last axis of rotation extends.

22. The coordinate measurement device of claim 21, wherein a probe extends through the opening in the common plate.

23. The coordinate measurement device of claim 22, wherein the probe is a touch probe.

24. The coordinate measurement device of claim 16, wherein the laser scanner assembly is rotatable relative to the probe.

25. An optical position acquisition member comprising:
a base member forming an opening shaped to accept a CMM measuring probe such as a touch probe;
a laser mounted on the base member; and
an optical sensor associated with the laser such that the optical sensor operatively views light emitted by the laser and reflected from a surface, the optical sensor further being mounted to the base member on a side of the opening opposite the laser.

26. The acquisition member of claim 25, wherein the base member comprises a material selected from the group consisting of invar, ceramic, steel, aluminum, plastic, or a carbon composite.

27. The acquisition member of claim 25, wherein the laser is within 100 mm of a center of the opening.

28. The acquisition member of claim 25, further comprising a first housing mounted on the base member and substantially enclosing the optical sensor.

29. The acquisition member of claim 25, wherein two or more optical sensors are mounted to the base member.

30. The acquisition member of claim 28, further comprising electronics in the first housing, operatively connected to the optical sensor.

31. The acquisition member of claim 30, wherein the electronics are thermally isolated from the laser.

32. The acquisition member of claim 25, wherein the base member is configured to rotatably mount to the probe, such that the base member can rotate independent of the probe.

* * * * *